US010809571B2

(12) United States Patent
Watanabe et al.

(10) Patent No.: US 10,809,571 B2
(45) Date of Patent: Oct. 20, 2020

(54) LIGHTING DEVICE AND DISPLAY DEVICE

(71) Applicant: SHARP KABUSHIKI KAISHA, Sakai, Osaka (JP)

(72) Inventors: Hisashi Watanabe, Sakai (JP); Hirotoshi Yasunaga, Sakai (JP); Youzou Kyoukane, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/477,351

(22) PCT Filed: Jan. 25, 2018

(86) PCT No.: PCT/JP2018/002206
§ 371 (c)(1),
(2) Date: Jul. 11, 2019

(87) PCT Pub. No.: WO2018/143039
PCT Pub. Date: Aug. 9, 2018

(65) Prior Publication Data
US 2020/0192162 A1    Jun. 18, 2020

(30) Foreign Application Priority Data
Jan. 31, 2017    (JP) .................................. 2017-015739

(51) Int. Cl.
*G02F 1/133*    (2006.01)
*G02F 1/13357*    (2006.01)

(52) U.S. Cl.
CPC .. *G02F 1/133611* (2013.01); *G02F 1/133605* (2013.01); *G02F 1/133606* (2013.01)

(58) Field of Classification Search
CPC ......... G02F 1/133611; G02F 1/133605; G02F 1/133606
See application file for complete search history.

(56) References Cited

U.S. PATENT DOCUMENTS 8,272,772 B2    9/2012    Sato et al.
2009/0067158 A1*    3/2009    Hamada ............ G02F 1/133603
362/97.3

(Continued)

FOREIGN PATENT DOCUMENTS

JP    2009-004248 A    1/2009

*Primary Examiner* — Anne M Hines
(74) *Attorney, Agent, or Firm* — ScienBiziP, P.C.

(57) ABSTRACT

A lighting device includes a casing, a light source, a light-collecting member, and a reflection member. The casing includes a light exiting portion. The light source is accommodated within the casing. The light-collecting member disposed in the light exiting portion. The light-collecting member includes unit light collectors each having long dimensions in a first direction and being arranged in a second direction perpendicular to the first direction. The reflecting member is disposed adjacent to the light source with respect to the light-collecting member in the light exiting portion. The reflecting member includes a light reflective portion and a light transmissive portion. The reflecting member includes a light source arrangement area including a section overlapping the light source. The light source arrangement area includes the light reflective portion with an area ratio larger than an area ratio of a light source non-arrangement area around the light reflective portion.

11 Claims, 13 Drawing Sheets

(56) References Cited

U.S. PATENT DOCUMENTS

2010/0177535 A1 7/2010 Sato et al.
2016/0076738 A1* 3/2016 Hsueh ............... G02F 1/133603
                                                    362/97.1

* cited by examiner

LIGHTING DEVICE AND DISPLAY DEVICE

TECHNICAL FIELD

The present invention relates to a lighting device and a display device.

BACKGROUND ART

Examples of surface illuminating light source devices used for a currently-used quid crystal display device include one described in Patent Literature 1 as under. The surface illuminating light source device described in the Patent Literature 1 includes a light source radiating light, a guide body propagating light from the light source and having a radiation surface at a prescribed position in a radiation direction of the light, a casing closing the light guide body except the radiation surface and having the light source arranged substantially at the center, an inner reflection section arranged between the casing and the light guide body and having a reflection surface which reflects propagating inside the light guide body, and a radiation side reflection section having an outer reflection section which is arranged on the radiation surface and has a reflection surface that reflects light propagating inside the light guide body at a prescribed rate and an opening section which is formed on the outer reflection section and through which reflection light reflected at least once on one of the reflection surfaces among the light from the light source passes.

RELATED ART DOCUMENT

Patent Literature

Patent Literature 1: Japanese Application Patent Publication No. 2009-4248A

Problem to be Solved by the Invention

The surface illuminating light source device described in the above Patent Literature 1 may cause a user to visually identify the opening section through which the reflection light passes as a locally bright portion, and is likely to generate uneven brightness.

DISCLOSURE OF THE PRESENT INVENTION

The technology described herein was made in view of the above circumstances. An object is to suppress generation of uneven brightness.

Means for Solving the Problem

A lighting device according to the present invention includes a casing, a light source, a light-collecting member, and a reflecting member having a light transmitting function. The casing includes a light exiting portion through which light exits. The light source is accommodated within the casing. The light-collecting member is disposed in the light exiting portion. The light-collecting member includes unit light collectors each having long dimensions in a first direction and being arranged in a second direction perpendicular to the first direction. The reflecting member having the light transmitting function is disposed adjacent to the at least one light source with respect to the light-collecting member in the light exiting portion. The reflecting member includes at least one light reflective portion and at least one light transmissive portion. The at least one light reflective portion is configured to reflect light. The at least one light transmissive portion is configured to transmit light. The reflecting member having the light transmitting function includes at least one light source arrangement area including at least a section overlapping the at least one light source. The at least one light source arrangement area includes the at least one light reflective portion with an area ratio larger than an area ratio of at least one light source non-arrangement area around the at least one light reflective portion. The at least one light transmissive portion is longitudinal along the first direction.

With such a configuration, the light from the light source is directly transmitted through the light transmissive portion of the reflecting member having the light transmitting function or reflected by the light reflective portion and is transmitted through the light transmissive portion. Thereafter, the light undergoes light collecting action selectively by the unit light collectors in the light-collecting member in the second direction as an arrangement direction of the unit light collectors, and exits from the light exiting portion of the casing. In the reflecting member having the light transmitting function, the light source arrangement area including at least the section overlapping the light source is relatively larger than the light source non-arrangement area around in area ratio of the light reflective portion. Accordingly, emission of the light from the light source arrangement area is suppressed and emission of the light from the light source non-arrangement area is promoted. This achieves a uniform quantity of emission light in the light exiting portion.

Now, the light transmitted through the light transmissive portions of the reflecting member having a light transmitting function undergoes light collecting action by the unit light collectors of the light-collecting member in the second direction, but the light does not undergo light collecting action in the first direction. Consequently, the light transmissive portions are unlikely to be identified visually as the bright portion since the light transmissive portions are visible artificially for the user to be in an extended shape in the second direction. On the other hand, the light transmissive portions are likely to be identified visually as the bright portion in the first direction.

Here, the light transmissive portions are longitudinal in the first direction as an extending direction of the unit light collectors. Accordingly, it becomes difficult for the user to identify the light transmissive portions visually as the bright portion since the light transmissive portions are visible artificially to be in a shape extending in the first direction. Thus, the light transmissive portions are unlikely to be identified as the bright portion visually in both the first and second directions, leading to difficulty in generation of the uneven brightness. Moreover, a smaller number of items is obtainable than the case where a second light-collecting member is prepared individually in addition to the light-collecting member described above. Here, the second light-collecting member includes second unit light collectors that are configured to extend in the second direction and to be arranged in the first direction.

The following configuration is preferred for the embodiment of the present invention.

(1) The at least one light transmissive portion and the at least one light reflective portion of the reflecting member having the light transmitting function include light transmissive portions and light reflective portions alternately arranged in the first direction and the second direction at least in the light source non-arrangement area. With such a configuration, light transmissive portions are arranged two-dimensionally in a staggered manner. Accordingly, it becomes difficult to identify the light transmissive portions visually as the bright portion.

(2) The light transmissive portions of the reflecting member having the light transmitting function to contact lines along the second direction between the light transmissive portions adjacent to one another in the first direction at least in the at least, one light source non-arrangement area. With such a configuration, the light transmitted through the light transmissive portions adjacent to one another in the first direction across the lines cross together more easily than the case where the light transmissive portions adjacent to one another in the first direction across the lines are spaced apart from the lines. Accordingly, it becomes more difficult to identify the light transmissive portions visually as the bright portion.

(3) The at least one light sources includes light sources arranged at intervals in at least one of the first direction and the second direction. The at least one light source arrangement area and the at least one light source non-arrangement area of the reflecting member having the light transmitting function include light source arrangement areas and light source non-arrangement areas, respectively. The light source arrangement areas are arranged at intervals along an arrangement direction of the light sources. The light source non-arrangement areas are disposed adjacent to one another around the light source arrangement areas. With such a configuration, reflection and transmittance of the light emitted from the light sources spaced apart is controlled by the light reflective portions and the light transmissive portions in the light source arrangement areas arranged in line at the intervals along the arrangement direction of the light sources and the light source non-arrangement areas around the light source arrangement areas in the reflecting member having the light transmitting function. This achieves a uniform quantity of emission light from the light exiting portion.

(4) The reflecting member having the light transmitting function includes an even number of the light reflective portions and an even number of the light transmissive portions disposed in the arrangement direction in the light source non-arrangement areas. With such a configuration, the light reflective portions and the light transmissive portions are each arranged at boundaries in the adjacent light source non-arrangement areas. This can prevent two successive arrangement of the light reflective portions or the light transmissive portions. Accordingly, it becomes more difficult to identify the light transmissive portions as the bright portion visually.

(5) The at least one the light reflective portion and the at least one light transmissive portion of the reflecting member having the light transmitting function include an odd number of the light reflective portions and an odd number of the light transmissive portions, respectively, in the arrangement direction in the light source non-arrangement areas. An arrangement of the light reflective portions and an arrangement of the light transmissive portions that are adjacent to the light reflective portions in the arrangement direction reversed from each other in a direction perpendicular to the arrangement direction in the light source non-arrangement areas. With such a configuration, when the odd number of light transmissive portions and the off number of light transmissive portions are disposed in the arrangement direction in the light source non-arrangement areas, the light reflective portions and the light transmissive portions are arranged reversely in the orthogonal direction in the adjacent light source non-arrangement areas in the arrangement direction. This achieves arrangement of the light reflective portions and the light reflective portions in line at the boundaries between the adjacent light source non-arrangement areas. This can prevent two successive arrangement of the light reflective portions or the light transmissive portions. Accordingly, it becomes more difficult to identify the light transmissive portions as the bright portion visually.

(6) The at least one light transmissive portion and the at least one reflective portion of the reflecting member having the light transmitting function include light transmissive portions and light reflective portions, respectively. The light transmissive portions and the light reflective portions are alternately arranged in the second direction in at least the light source non-arrangement areas. The light transmissive portions and the light reflective portions extend for an entire length of the reflecting member having the light transmitting function in the first direction. With such a configuration, the light transmissive portions and the light reflective portions are arranged in the reflecting member having the light transmitting function in a simpler manner than the case where every plural light transmissive portions and every plural light reflective portions are arranged alternately in the first direction and the second direction. This achieves excellent productivity.

(7) The reflecting member having the light transmitting function includes a light reflector configured to reflect light. The light reflector includes openings and portions in which the openings are not formed. The openings are formed by opening sections of a plate face to define the light transmissive portions. The portions define the light reflective portions. With such a configuration, higher positional accuracy and higher dimensional accuracy of the openings that form the light transmissive portions are obtainable than the case where the light reflective portions and the light transmissive portions are formed by printing a light reflective film partially on a plate face of a light transmitting plate. This can produce light reflecting performance and light transmitting performance by the light reflective portions and the light transmissive portions suitably.

(8) The referencing member having the light transmitting function includes a light transmitting plate that transmits light and light reflective films that are formed in sections of a plate face of the light transmitting plate to define the light reflective portions. The light transmitting plate includes sections in which the light reflective films are not formed. The sections define the light transmissive portions. With such a configuration, easier production is obtainable than the case where the light reflective portions and the light transmissive portions are formed by forming the opening partially in the light reflector. This is suitable for reduction in production cost. Especially, this is suitable for complicated arrangement patterns of the light reflective portions and the light transmissive portions.

(9) The reflecting member having the light transmitting function contains a diffusing agent so that the light transmitting plate diffuses light. The diffusing agent contained in the light transmitting plate is used for diffusing light as described above. Accordingly, it is no need to prepare an additional diffusion plate having a light diffusing function. This is suitable for obtaining reduction in number of items and in thickness.

In order to solve the above drawbacks, a display device according to the present invention includes the lighting device described above and a display panel configured to display an image using light from the lighting device. The display device having such a configuration makes it difficult to generate uneven brightness in the light emitted from the lighting device, achieving display with high display quality.

Advantageous Effect of the Invention

The present invention enables suppressed generation of uneven brightness.

MODES FOR CARRYING OUT THE INVENTION

First Embodiment

Figure 1:
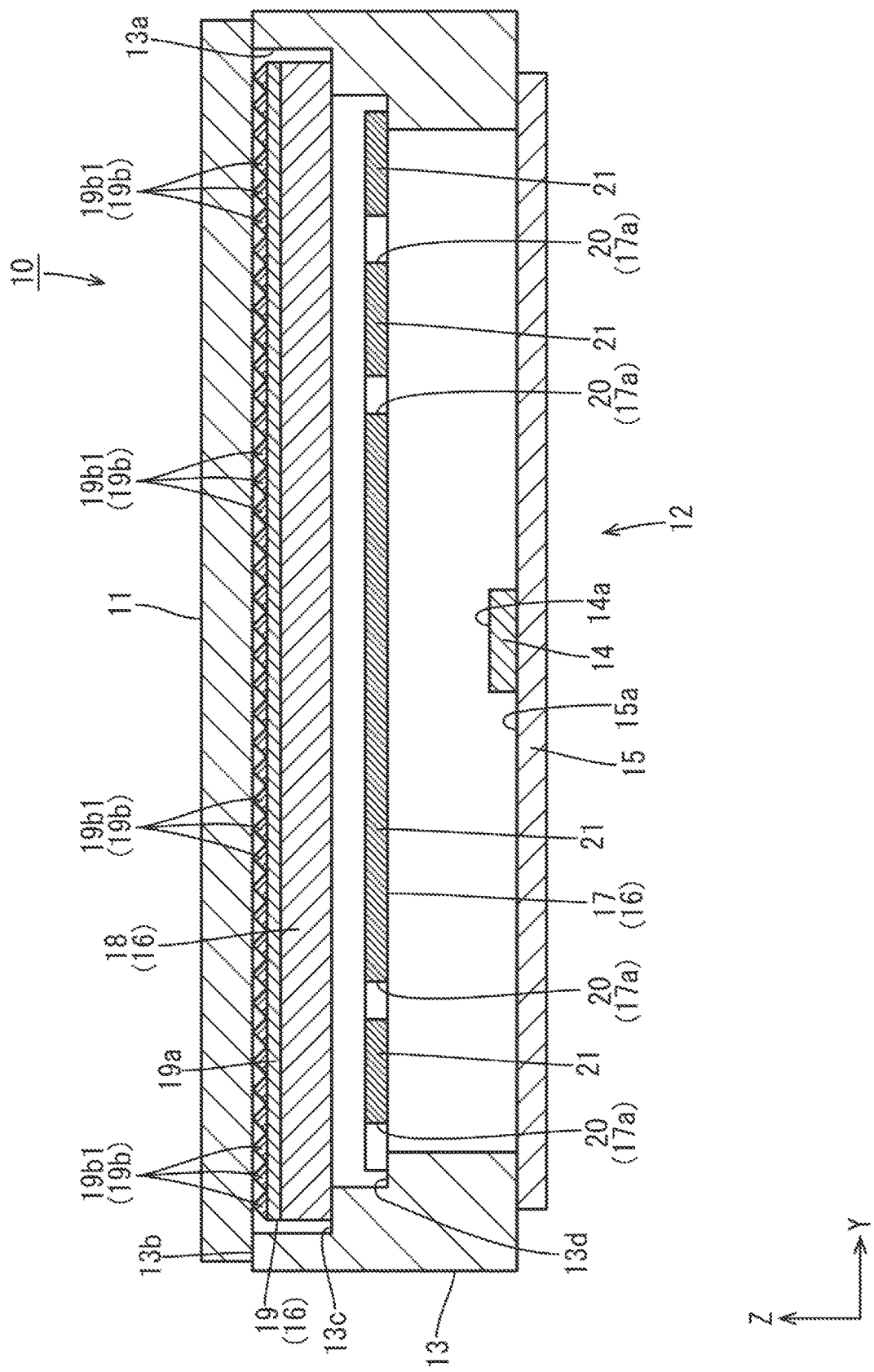
FIG. 1 is a sectional view of a liquid crystal display device according to a first embodiment.

The following describes a first embodiment of the present invention with FIGS. 1 to 4. The present embodiment exemplarily describes a liquid crystal display device (display device) 10. Note that each of drawings partially indicates an X-axis, a Y-axis, and a Z-axis, each of which corresponds to the direction where the drawing is illustrated. Moreover, upward and downward directions illustrated in FIG. 1 correspond to front and rear sides, respectively.

The liquid crystal display device 10 is substantially rectangle in its entirety. As illustrated in FIG. 1, the liquid crystal display device 10 includes at least a liquid crystal panel (display panel) 11 that is capable of displaying an image, and a back light device (lighting device) 12 as an external light source that is disposed at a rear side (light incidence side) with respect to the liquid crystal panel 11 and is configured to apply light for display to the liquid crystal panel 11. The liquid crystal panel 11 and the back light device 12 have outer circumferential ends (non-displayed area and non-effective light emittance area) fixed on each other via a light-blocking fixing tape (not shown). The light-shielding fixing tape is, for example, formed by coating double faces of a base with light-blocking property with an adhesive. Note that the liquid crystal panel 11 and the back light device 12 may be fixed with a transparent adhesive member such as an optical clear adhesive (OCA).

As illustrated in FIG. 1, the liquid crystal panel 11 includes paired glass substrates that adhere to each other by a given gap, and a liquid crystal layer (not shown) between the glass substrates. The liquid crystal layer contains liquid crystal molecules whose optical property is variable as an electric field is applied. One of the glass substrates (array substrate, active matrix substrate) includes an inner surface on which switching elements (e.g., TFTs) and pixel electrodes are arranged two-dimensionally in a matrix array, and on which an alignment film is arranged. The switching elements each have a source line and a gate line connected thereto. The source line and the gate line intersect each other. The pixel electrodes are each arranged in a rectangle region surrounded by the source line and the gate line and are connected to the switching elements. The other of the glass substrates (opposite substrate, CF substrate) includes an inner surface where color filters, a light-shielding layer (black matrix) flat counter electrodes, and an alignment film are arranged. The color filters include coloring parts of R (red), G (green), and B (blue) provided two-dimensionally in given arrangement in a matrix array. The light-shielding layer is disposed between adjacent coloring parts to be formed in a grid shape. The counter electrodes face to the pixel electrodes. Moreover, polarizers are provided on outer faces of the glass substrates individually. Moreover, a long side direction, a short side direction, and a thickness direction in the liquid crystal panel 11 correspond to an X-axis direction, a Y-axis direction, and a Z-axis direction, respectively.

Figure 2:
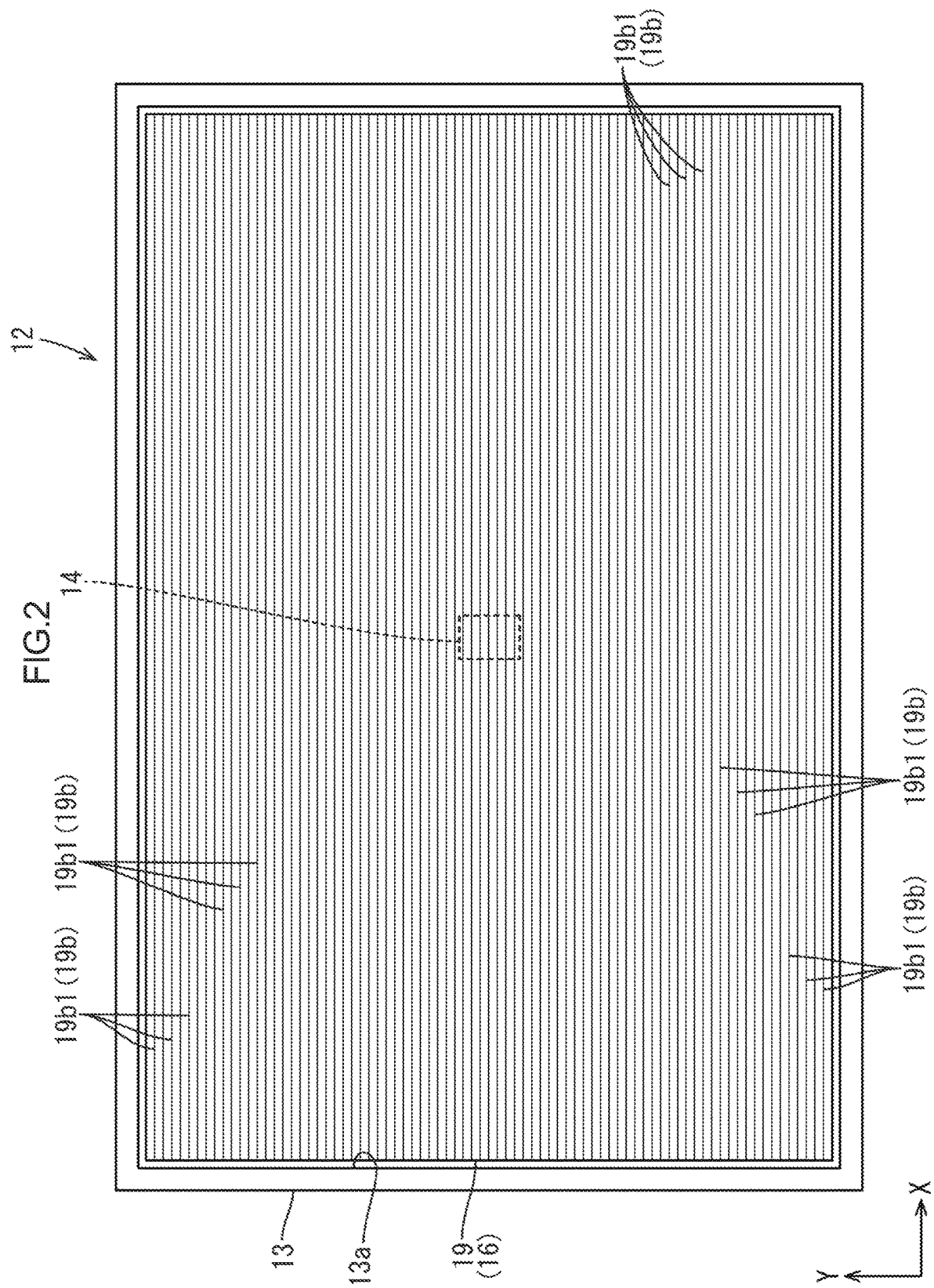
FIG. 2 is a plan view of a back light device that forms the liquid crystal display device.

The following describes in detail the back light device 12. Similar to the liquid crystal panel 11, the back light device 12 is horizontally rectangle in plan view as illustrated in FIG. 2. As illustrated in FIGS. 1 and 2, the back light device 12 includes a casing 13, an LED (light source) 14, an LED substrate 15, and an optical member 16. The casing 13 includes a light exiting portion 13a on a front side (adjacent to the liquid crystal panel 11) that is configured to emit light. The LED 14 is accommodated within the casing 13. The LED 14 is bonded on the LED substrate 15. The optical member 16 is in a plate or a sheet shape (sheet shape), and is disposed on the light exiting portion 13a. As described above, the back light device 12 according to this embodiment includes the LED 14 beneath the liquid crystal panel 11 and the optical member 16, and an emission face 14a of the LED 14 faces to the liquid crystal panel 11 and the optical member 16. This is so-called direct type. The following describes each component of the back light device 12 in detail.

As illustrated in FIGS. 1 and 2, the casing 13 is in a box shape (frame shape) along the outer circumferential ends of the liquid crystal panel 11 and the optical member 16. The casing 13 is opened on front and rear sides in the Z-axis direction. An opened part on the front side forms the light exiting portion 13a. The casing 13 is formed by paired long-side parts and paired short-side parts. The long-side parts extend in the long side direction (X-axis direction) of the liquid crystal panel 11 and the optical member 16, whereas the long-side parts extend in the long side direction (Y-axis direction) of the liquid crystal panel 11 and the optical member 16. The casing 13 has a three-step sectional shape. A first step 13b on the frontmost side (uppermost layer) supports the outer circumferential end of the liquid crystal panel 11 from the rear side. A second step 13c and a third step 13d corresponding to two steps on the rear side support the outer circumferential end of the optical member 16 from the rear side. Accordingly, an opening area of the light exiting portion 13a of the casing 13 varies in a stepwise manner depending on the steps 13b to 13d. The opening area tends to become larger toward the front side, and conversely smaller toward the rear side.

As illustrated in FIG. 1, the LED 14 is bonded on a surface of the LED substrate 15. The emission face 14a of the LED 14 faces opposite to the LED substrate 15 (to the front side). This is so-called surface emitting type. The LED 14 has a positional relationship where the emission face 14a faces a plate face of the optical member 16. The LED 14 is configured in such a manner that an LED chip (LED element) as a semiconductor light emitting device is sealed on a substrate part adhering on a plate face of the LED substrate 15 with a sealant. The LED chip emits monochromatic light, such as blue light, and luminescent substances (e.g., yellow luminescent substance, green luminescent substance, red luminescent substance) are dispersed and compounded in the sealant. Consequently, the LED 14 emits white light entirely. A distribution of luminous intensity in the LED 14 in plan view has the tendency that an amount of luminescence becomes the maximum at the central position of the LED 14, and an amount of luminescence gradually decreases apart from the central position, which is closely analogous to a normal distribution.

As illustrated in FIGS. 1 and 2, the LED substrate 15 is rectangle in plan view like the liquid crystal panel 11, and is configured to close an opened part of the casing 13 on the rear side. The LED substrate 15 includes a plate face on the front side that faces to the optical member 16, which face corresponds to a bonding surface 15a on which the LED 14 configured in such a manner as above is bonded. One LED 14 is only bonded at substantially the center (central position in the X-axis direction and the Y-axis direction) of the bonding surface 15a on the LED substrate 15. The LED substrate 15 is made from a metal such as an aluminum-based material. The LED substrate 15 includes a surface on which a wiring pattern (not shown) made of a metal film such as a copper foil is formed via an insulating layer, and includes an outermost surface on which a reflection layer (not shown) in white is formed. The reflection layer reflects light emitted from the LED 14 and returned toward the LED substrate 15. Consequently, the reflected light is deflected upward to the front side to use as emission light. It should be noted that an insulating material such as ceramic is usable as the material for a base of the LED substrate 15. Moreover, a similar light reflecting function is obtainable by laminating a reflection sheet made from a material different from that of the LED substrate 15 (such as a synthetic resin material whose surface is while (e.g., PET)) on the outermost surface of the LED substrate 15.

As illustrated in FIGS. 1 and 2, the optical member 16 is rectangle in plan view and in a plate or sheet shape, which is similar to the liquid crystal panel 11 and the LED substrate 15. The optical member 16 is disposed between the liquid crystal panel 11 and the LED 14 in the Z-axis direction. The optical member 16 has the function to emit light from the LED 14 to the liquid crystal panel 11 while applying given optical action to the light. The optical member 16 faces to the LED 14 by a given gap toward the front side, i.e., the light emission side, and is supported by the casing 13 already mentioned from the rear side. This maintains a substantially constant gap between the optical member 16 and the LED 14. The plate face of the optical member 16 is divided into an effective light emission area in the center portion and a non-effective light emission area as an outer circumference portion so as to surround the effective light emission area. In the effective light emission area, light is able to be emitted effectively. In the non-effective light emittance area, light is unable co be emitted effectively. The effective light emission area is an area where emission is supplied to an active area of the liquid crystal panel 11 to be used effectively for displaying an image. The effective light emission area is overlapping the active area in plan view.

As illustrated in FIG. 1, three optical members 16 are provided in total. These are a reflection sheet 17 having a light transmitting function (a reflecting member having a light transmitting function), a diffusion plate 18, and a prism sheet (light-collecting member) 19 in this order from, the rear side. Among them, the reflection sheet 17 having the light transmitting function is supported on the third step 13d disposed on the rearmost side (lowermost layer) in the casing 13. In contrast to this, the diffusion plate 18 is supported on the second step 13c in the middle layer the casing 13. The prism sheet 19 is laminated directly on the front side of the plate face of the diffusion plate 18 for support. The following describes the diffusion plate 18 and the prism sheet 19 firstly.

As illustrated in FIG. 1, the diffusion plate 18 has a thickness larger than that of the reflection sheet 17 having the light transmitting function and the prism sheet 19. The diffusion plate 18 is configured by dispersing many diffusion particles (diffusing agent) in the base (light transmitting plate) made from a substantially transparent synthetic resin material (e.g., polycarbonate and acryl). The diffusion plate 18 has a function to diffuse transmitted light. The prism sheet 19 is formed by a base 19a and a prism part (light-collecting part) 19b. The base 19a has a thickness smaller than that of the diffusion plate 18, and is made from a substantially transparent synthetic resin. The prism part 19b is formed on a plate face of the base 19a. As illustrated in FIGS. 1 and 2, the prism part 19b is formed by many unit prisms (unit light collectors) 19b1 arranged along a short side direction (second direction, Y-axis direction) of the prism sheet 19. The unit prisms 19b1 extend in a long side direction (first direction, X-axis direction) of the prism sheet 19. It is preferred that the unit prisms 19b1 each have a vertex angle of 90 degrees, for example. However, this is not necessarily limitative. The prism sheet 19 is provided for applying light collecting action to light transmitted therethrough only in the Y-axis direction as an arrangement direction of the unit prisms 19b1 selectively. Consequently, in the prism sheet 19, the arrangement direction of the unit prisms 19b1 (second direction, Y-axis direction) corresponds to a light collecting direction in which the light collecting action is applied to the transmitted light, whereas an extending direction of the unit prisms 19b1 (first direction, X-axis direction) corresponds to a non-light collecting direction in which little light collecting action is applied to the transmitted light.

Figure 3:
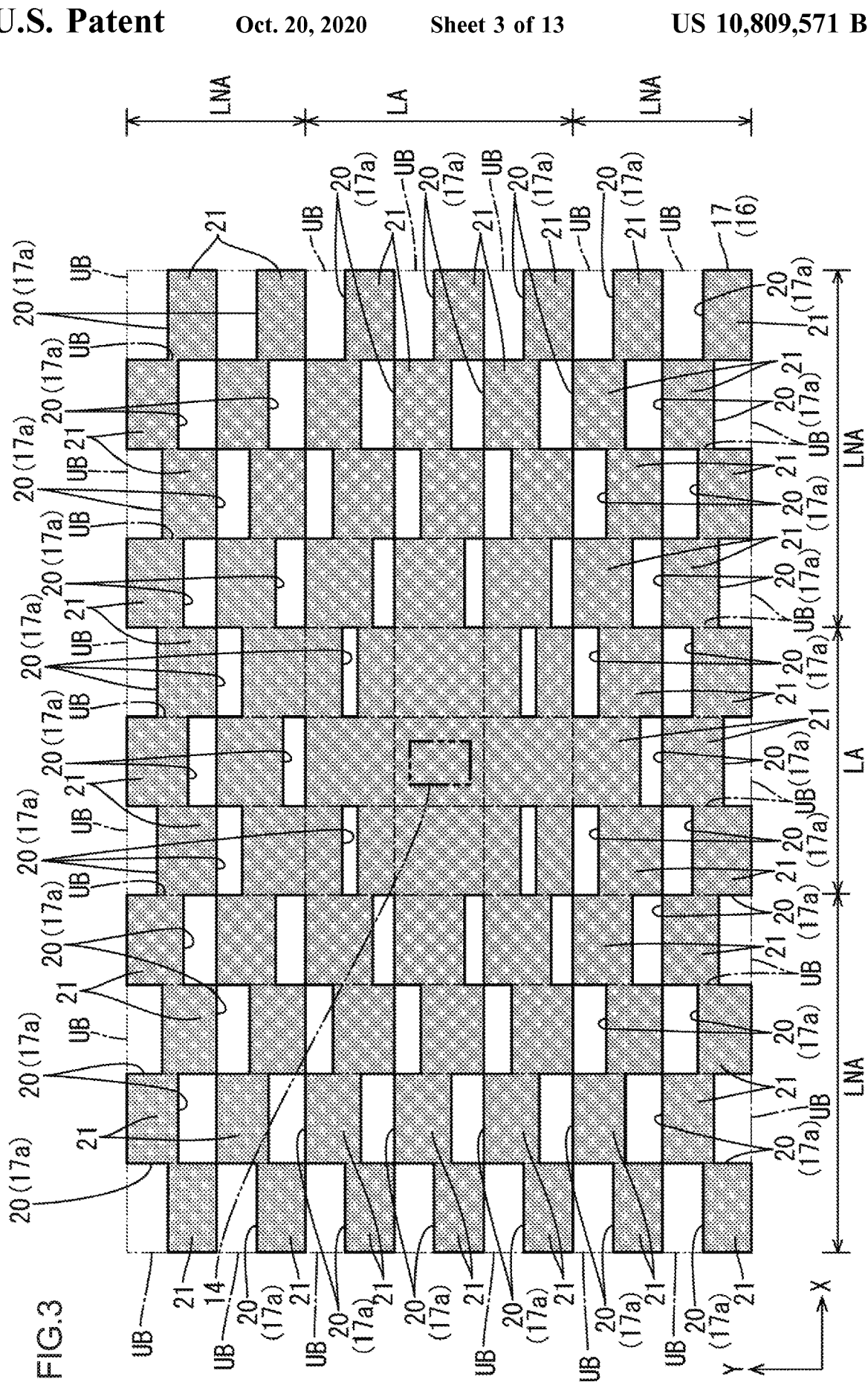
FIG. 3 is a plan view of a reflection sheet having the light transmitting function that forms the back light device.

The next describes in detail the reflection sheet 17 having the light transmitting function. As illustrated in FIGS. 1 and 3, the reflection sheet 17 having the light transmitting function has a thickness smaller than that of the diffusion plate 18, and is formed by a plate (reflector) made from a synthetic resin (e.g., made from PET) whose surface is white with an excel lent light reflecting property. While the reflection sheet 17 having light transmitting function is supported on the third step 13d of the casing 13, the reflection sheet 17 having the light transmitting function is spaced apart from the diffusion plate 18 by a gap in the Z-axis direction. Here, the diffusion plate 18 is disposed on the front side (opposite to the LED 14) and is supported by the second step 13c. The reflection sheet 17 having the light transmitting function includes openings 17a partially formed in the plate face thereof. The openings 17a form light transmissive portions 20 configured to transmit light. The openings 17a are configured to pass through the plate of the reflection sheet 17 having the light transmitting function in the Z-axis direction (plate thickness direction). Consequently, the reflection sheet 17 having the light transmitting function includes a portion where no opening 17a is formed. The portion forms the light reflective portions 21 that are configured to reflect light. Examples of a technique of forming the openings 17a in the plate of the reflection sheet 17 having the light transmitting function include one to provide a molding face for forming the openings 17a into a mold used for resin molding of the plate of the reflection sheet 17 having the light transmitting function. Otherwise, resin molding may be performed to the plate of the reflection sheet 17 having the light transmitting function, and thereafter drilling or laser beam machining may be performed to the plate. With such a configuration, higher positional accuracy and higher dimensional accuracy of the openings 17a that form the light transmissive portions 20 is obtainable than the case where the light reflective portions and the light transmissive portions are formed in a plate face of a transparent plate by printing a light reflective film partially on a plate face of the transparent plate. Accordingly, light reflective performance and light transmitting performance by the light reflective portions 21 and the light transmissive portions 20, respectively, can be produced suitable. Note that FIG. 3 illustrates by hatch a region where the light reflective portions are formed in the reflection sheet 17 having the light transmitting function.

In addition, as illustrated in FIG. 3, the reflection sheet 17 having the light transmitting function is divided into an LED arrangement area tight source arrangement area) LA and an LED non-arrangement area (light source non-arrangement area) LNA in its plate face. The LED arrangement area LA contains a region that overlapping the LED 14 in plan view. The LED non-arrangement area LNA surrounds the LED arrangement area LA. FIG. 3 illustrates regions where the LED arrangement area LA and the LED non-arrangement area LNA are formed in the X-axis direction and the Y-axis direction by arrows. The LED arrangement area LA is composed by a portion overlapping the LED 14, and a frame region surrounding the portion and not overlapping the LED 14. The LED arrangement area LA constitutes the center portion of the reflection sheet 17 having the light transmitting function. The LED non-arrangement area LNA is composed of an outer circumference portion in a box shape except for the LED arrangement area LA of the reflection sheet 17 having the light transmitting function. Comparison between the LED arrangement area LA and the LED non-arrangement area LNA reveals that, in the LED arrangement area LA, the light reflective portions 21 have a relatively larger area ratio (a ratio in gross area of the light reflective portions 21 to the light transmissive portions 20 and the light reflective portions 21), and that the light transmissive portions 20 have a relatively smaller area ratio (a ratio in gross area of the light transmissive portions 20 to the light transmissive portions 20 and the light reflective portions 21). In contrast to this, comparison between the LED arrangement area LA and the LED non-arrangement area LNA reveals that, in the LED non-arrangement area LNA, the light reflective portions 21 have a relatively smaller area ratio whereas the light transmissive portions 20 have a relatively larger area ratio. According to the reflection sheet 17 having the light transmitting function with such a configuration, a larger quantity of light emitted from the LED 14 is supplied to the LED arrangement area LA than to the LED non-arrangement area LNA. On the other hand, the LED arrangement area LA has a larger area ratio of the light reflective portions 21 than the LED non-arrangement area LNA. Accordingly, a more quantity of light is able to be reflected by the light reflective portions 21 toward the LED non-arrangement area LNA, leading to suppressed transmittance of light from the light transmissive portions 20. In contrast to this, a smaller quantity of light emitted from the LED 14 is supplied to the LED non-arrangement area LNA than to the LED arrangement area LA. On the other hand, the LED non-arrangement area LNA has a larger area ratio of the light transmissive portions 20 than the LED arrangement area LA. Accordingly, reflection of light by the light reflective portions 21 is suppressed, achieving a large quantity of light transmitted through the light transmissive portions 20. Accordingly, emission of the light from the LED arrangement area LA is suppressed and emission of the light from the LED non-arrangement area LNA is promoted. This achieves a uniform quantity of emission light in the light exiting portions 13a.

Figure 4:
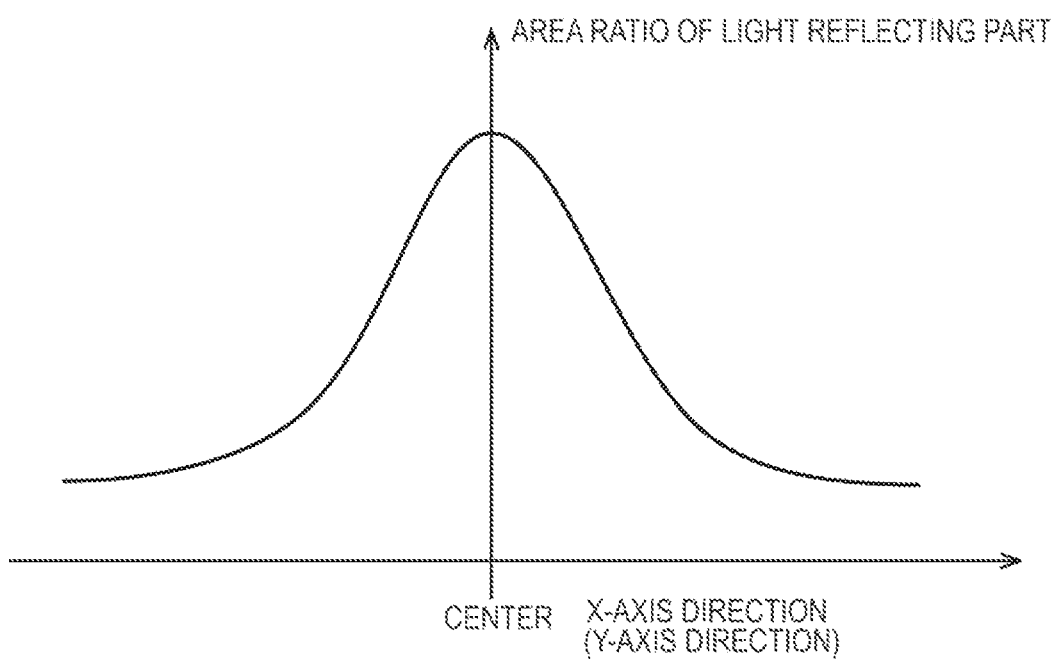
FIG. 4 is a graph representing an area ratio of light reflective portions in an X-axis direction or a Y-axis direction in LED non-arrangement areas of the reflection sheet having the light transmitting function.

Moreover, as illustrated in FIG. 4, the LED non-arrangement area LNA provides such a distribution that the area ratio of the light reflective portions 21 becomes gradually small successively as they are apart from the LED 14 (the central position in the X-axis direction and the Y-axis direction), whereas the area ratio of the light reflective portions 21 becomes gradually large successively as they approach the LED 14. Note that FIG. 4 is a graph representing the area ratio of the light reflective portions 21 in the X-axis direction or the Y-axis direction in the LED non-arrangement area LNA of the reflection sheet 17 having the light transmitting function. Consequently, the LED non-arrangement area LNA provides such a distribution that the area ratio of the light transmissive portions 20 becomes gradually large successively as they are apart from the LED 14, whereas the area ratio of the light transmissive portions 20 becomes gradually small successively as they approach the LED 14. As described above, the area ratio of the light reflective portions 21 in the LED non-arrangement area LNA tends to be inversely proportional to a distance from the LED 14. Consequently, while a relatively large quantity of light supplied from the LED 14 is obtained in a portion in the LED non-arrangement area LNA adjacent to the LED 14, the light reflective portions 21 having a relatively large area ratio can reflect a large quantity of light and can deflect the light to a portion apart from the LED 14. In contrast to this, the area ratio of the light transmissive portions 20 in the LED non-arrangement area LNA tends to be proportional to a distance from the LED 14. Consequently, while a relatively small quantity of light supplied from the LED 14 is obtained in a portion in the LED non-arrangement area LNA apart from the LED 14, the light transmissive portions 20 having a relatively large area ratio can transmit a large quantity of light relatively. Accordingly, emission of the light at the portion in the LED non-arrangement area LNA adjacent to the LED 14 is suppressed and emission of the light at the portion apart from the LED 14 is promoted. This achieves a uniform quantity of emission light in the LED non-arrangement area LNA.

Now, as illustrated in FIG. 2, the light transmitted through the light transmissive portions 20 in the reflection sheet 17 having the light transmitting function undergoes light collecting action in the Y-axis direction (second direction) as the arrangement direction by the unit prisms 19b1 in the prism sheet 19, whereas undergoes less light collecting action in the X-axis direction (first direction) as the extending direction. The light collecting action means that light incident into the prism sheet 19 at various angles is caused to be deflected along a normal line direction (Z-axis direction) of the prism sheet 19 with use of refraction action by the unit prisms 19b1. In other words, the light crosses together in the Y-axis direction under the light collecting action, but the light in the X-axis direction under no light collecting action is not influenced. Consequently, the light transmissive portions 20 are unlikely to be identified as the bright portion visually since the light transmissive portions 20 are visible artificially for the user to be in an extended shape (expanded) in the Y-axis direction. On the other hand, the light transmissive portions 20 are likely to be identified visually as the bright portion locally in the X-axis direction. Even if a second prism sheet is prepared, in addition to the prism sheet 19, such that unit prisms thereof are disposed orthogonal to the extending direction and the arrangement direction of the prism sheet 19 described above, the light transmissive portions 20 are unlikely to be identified visually as a bright portion also in the X-axis direction. On the other hand, the number of optical members 16, i.e., the number of items is increased, leading to possibility of high costs.

Then, as illustrated in FIG. 3, the reflection sheet 17 having the light transmitting function according to this embodiment includes the light transmissive portions 20 that are longitudinal along the X-axis direction (first direction) as the extending direction of the unit prisms 19b1 in the prism sheet 19. Specifically, the light transmissive portions 20 are rectangle in plan view. A long side direction and a short side direction of the light transmissive portions 20 corresponds to the X-axis direction and the Y-axis direction (second direction), respectively. The light reflective portions 21 are also rectangle in plan shape like the light transmissive portions 20. The light transmissive portions 20 and the light reflective portions 21 each have a long side whose dimension (dimension in the first direction) is equal to each other. As described above, the light transmissive portions 20 are longitudinal along the X-axis direction as the extending direction of the unit prisms 19b1 in the prism sheet 19. This causes the light transmissive portions 20 to extend in the Y-axis direction artificially due to a light collecting effect of the prism sheet 19 (selective light collecting effect). Consequently, the light transmissive portions 20 are visible artificially for the user to be in the extended shape (expanded) also in the X-axis direction, and are unlikely to be identified visually as the bright portion locally in the X-axis direction. Thus, the Light transmissive portions 20 are unlikely to be identified as the bright portion visually in both the Y-axis direction and the X-axis direction, leading to difficulty in generation of the uneven brightness. Now, in comparison with the case where the second prism sheet is prepared, in addition to the prism sheet 19, such that unit prisms thereof are disposed orthogonal to the extending direction and the arrangement direction of the prism sheet 19 described above, the number of optical members 16, i.e., the number of items can be reduced, achieving a lowered cost.

As illustrated in FIG. 3, every plural light transmissive portions 20 and every plural light reflective portions 21 are arranged alternately in the Y-axis direction and the X-axis direction in at least the LED non-arrangement area LNA of the reflection sheet 17 having the light transmitting function. In other words, every plural light transmissive portions 20 and every plural light reflecting parts 21 are arranged two-dimensionally in a staggered manner in the LED non-arrangement area LNA of the reflection sheet 17 having the light transmitting function. As described above, the plural light transmissive portions 20 are arranged in a staggered manner in plan view. Accordingly, the light transmissive portions 20 and the light reflective portions 21 can be arranged alternately in the X-axis direction in which the parts are likely to be visible as a relatively bright portion, leading to difficulty in visual identification of the parts as the bright portion.

In order to describe the light transmissive portions 20 and the light reflective portions 21 in more detail, the plate face of the reflection sheet 17 having the light transmitting function is divided into a large number of unit blocks UB that are substantially square in plan view as in FIG. 3. It should be noted that FIG. 3 schematically illustrates the unit blocks UB by fine alternate long and short dashed lines. The plural unit blocks UB are arranged in a matrix array in the Y-axis direction and the X-axis direction in the plate face of the reflection sheet 17 having the light transmitting function. The unit blocks UB each have sides whose dimensions are each slightly larger than the maximum outer dimension of the LED 14, and are equal to the long side dimension of the light transmissive portions 20 and the light reflective portions 21. One light transmissive portion 20 and one light reflective portion 21 are arranged adjacent to each other in the Y-axis direction in one unit block UB in the LED non-arrangement area LEA. Consequently, the sum of a short side dimension of the light transmissive portion 20 and a short side dimension of the light reflective portion 21 forming the same unit block UB corresponds to a dimension of each side of the unit block UB. In the unit block UN arranged in the LED non-arrangement area LNA, there is the tendency that the short side dimension of the light transmissive portion 20 becomes larger as it is apart from the LED 14, and conversely becomes smaller as it approaches the LED 14. In contrast to this, the short side dimension of the light reflective portion 21 becomes smaller as it is apart from the LED 14, and conversely becomes larger as it approaches the LED 14. The unit blocks UB adjacent to each other in the Y-axis direction in the LED non-arrangement area LNA are arranged such that the light transmissive portion 20 and the light reflective portion 21 are aligned in the Y-axis direction, and accordingly, the light transmissive portion 20 and the light reflective portion 21 are repeatedly arranged alternately in the Y-axis direction. In contrast to this, the unit blocks UB adjacent to each other in the X-axis direction in the LED non-arrangement area LNA are arranged such that the light transmissive portion 20 and the light reflective portion 21 forming one of the adjacent unit blocks UB are aligned in the Y-axis direction in a reversed manner as that of alignment of the light transmissive portion 20 and the light reflective portion 21 forming the other of the adjacent unit blocks UB in the Y-axis direction. As described above, the light transmissive portions 2C and the light reflective portions 21 are arranged alternately in the Y-axis direction and the X-axis direction in the staggered manner. In this embodiment, the light transmissive portion 20 is formed by the openings 17a. Consequently, the maximum area ratio of the light transmissive portions 20 to the unit blocks UB in the LED non-arrangement area is less than 50%. This achieves physical connection between adjacent unit blocks UB in the LED non-arrangement area LNA by the light reflective portion 21.

As illustrated in FIG. 3, the LED arrangement area LA in the reflection sheet 17 having the light transmitting function includes nine unit blocks UP in total including the LED 14 as the center in plan view. Specifically, the unit block UB that is configured to be overlapping the LED 14 in plan view in the LED arrangement area LA, and four unit blocks UB adjacent thereto in the X-axis direction and the Y-axis direction contain no light transmissive portion 20, and contain only the light reflective portions 21. In contrast to this, four unit blocks UB adjacent to the unit block UB configured to be overlapping the LED 14 in plan view in the LED arrangement area LA in an oblique manner with respect to the X-axis direction and the Y-axis direction each contain the light transmissive portion 20 at the central position in the Y-axis direction, and paired light reflective portions 21 on both ends in the Y-axis direction with respect to the light transmissive portion 20. The light transmissive portions 20 that form these four unit blocks UP includes an area (short side dimension) smaller than an area of any of the light transmissive portions 20 forming the unit blocks UP in the LED non-arrangement area LNA.

According to the configuration as described above, boundaries for separating the adjacent unit blocks UP in the X-axis direction are lines along the Y-axis direction in the LED non-arrangement area LNA of the reflection sheet 17 having the light transmitting function. The light transmissive portions 20 each forming the adjacent unit blocks UB in the X-axis direction are arranged in such a manner so as to be adjacent to one another across the lines and so as to contact the line. With such a configuration, the light transmitted through the light transmissive portions 20 adjacent to one another in the X-axis direction across the lines crosses together more easily than the case where the light transmissive portions 20 adjacent to one another in the X-axis direction across the lines are spaced apart from the lines. Accordingly, it becomes more difficult to identify the light transmissive portions 20 as the bright portion visually.

As described above, the back light device (lighting device) 12 according to this embodiment includes the casing 13, the LED (light source) 14, the prism sheet (light-collecting member) 19, and the reflection sheet with light transmitting function (reflecting member with light transmitting function) 17. The casing 13 includes the light exiting portion 13a configured to emit light. The LED 14 is accommodated within the casing 13. The prism sheet 19 is disposed in the light exiting portion 13a, and includes unit prisms (unit light collectors) 19b1 configured to extend in the first direction and to be arranged in line along the second direction orthogonal to the first direction. The reflection sheet 17 having the light transmitting function is disposed adjacent to the LED 14 with respect to the prism sheet 19 in the light emitting part 13a. The reflection sheet 17 includes the light reflective portions 21 and the light transmissive portions 20. The light reflective portions 21 are configured to reflect light. The light transmissive portions 20 are configured to transmit light. The reflection sheet 17 having the light transmitting function has the LED arrangement area (light source arrangement area) LA containing at least a portion overlapping the LED 14, the LED arrangement area LA being relatively larger than the LED non-arrangement area (light source non-arrangement area) NLA therearound in area ratio of the light reflective portions 21. At least the light transmissive portions 20 are longitudinal along the first direction.

With such a configuration, the light emitted from the LED 14 is transmitted through the light transmissive portions 20 of the reflection sheet 17 having the light transmitting function directly or is reflected by the light reflective portions 21 and is transmitted through the light transmissive portions 20. Thereafter, the light undergoes the light collecting action selectively by the plural unit prisms 19b1 in the prism sheet 19 in the second direction as the arrangement direction of the unit prisms 19b1, and is emitted from the light exiting portion 13a of the casing 13. In the reflection sheet 17 having the light transmitting function, the LED arrangement area LA at least containing the portion overlapping the LED 14 therearound is relatively larger than the LED non-arrangement area LNA therearound in area ratio of the light reflective portions 21. Accordingly, emission of the light from the LED arrangement area LA is suppressed and emission of the light from the light source non-arrangement area LNA is promoted. This achieves a uniform quantity of emission light in the light exiting portion 13a.

Now, the light transmitted through the light transmissive portions 20 in the reflection sheet 17 having the light transmitting function undergoes light collecting action in the second direction by the unit prisms 19b1 in the prism sheet 19, whereas the light does not undergo light collecting action in the first direction. Consequently, the light transmissive portions 20 are unlikely to be identified visually as the bright portion since the light transmissive portions 20 are visible artificially for the user to be in the extended shape in the second direction. On the other hand, the light transmissive portions 20 are likely to be identified visually as the bright portion in the first direction.

Here, the light transmissive portions 20 are longitudinal in the first direction as the extending direction of the unit prisms 19b1. Accordingly, it becomes difficult for the user to identify the light transmissive portions 20 visually as the bright portion since the light transmissive portions 20 are visible artificially to be in the shape extending in the first direction. Thus, the light transmissive portions 20 are more unlikely to be identified visually as the bright portions in both the first and second directions, leading to difficulty in generation of the uneven brightness. Moreover, a smaller number of items is obtainable than the case where a second prism sheet is prepared individually in addition to the prism sheet 19 described above. Here, the second prism sheet includes second unit prisms that are configured to extend in the second direction and to be arranged in the first direction.

Moreover, every plural light transmissive portions 20 and every plural light reflective portions 21 are arranged alternately in at least the LED non-arrangement area LNA of the reflection sheet 17 having the light transmitting function in the first direction and the second direction. With such a configuration, light transmissive portions 20 are arranged two-dimensionally in a staggered manner. Thus, it becomes difficult to identify the light transmissive portions 20 visually as the bright portion.

Moreover, the reflection sheet 17 having the light transmitting function has the light transmissive portions 20 that are arranged in such a manner so as to be adjacent to one another in the first direction across lines along the second direction and so as to contact the lines in at least LED non-arrangement area LNA. With such a configuration, the light transmitted through the light transmissive portions 20 adjacent to one another in the first direction across the lines cross together more easily than the case where the light transmissive portions 20 adjacent to one another in the first direction across the lines are spaced apart from the lines. Accordingly, it becomes more difficult to identify the light transmissive portions 20 visually as the bright portion.

Moreover, the reflection sheet 17 having the light transmitting function is composed of the light reflector configured to reflect light. The light reflector has the openings 17a that are partially opened in the plate face of the light reflector and are configured to form the light transmissive portions 20, and a portion where the openings 17a are not formed to constitute the light reflective portions 21. With such a configuration, higher positional accuracy and higher dimensional accuracy of the openings 17a that form the light transmissive portions 20 are obtainable than the case where the light reflective portions and the light transmissive portions are formed by printing the light reflective film partially on the plate face of the light transmitting plate. This can produce light reflecting performance and light transmitting performance by the light reflective portions and the light transmissive portion suitably.

Moreover, the liquid crystal display device (display device) 10 according to this embodiment includes the back light device 12 described above, and a liquid crystal panel (display panel) 11 configured to display an image with use of light emitted from the back light device 12. The liquid crystal display device 10 having such a configuration makes it difficult to generate uneven brightness in the light emitted from the back light device 12, achieving display with high display quality.

Second Embodiment

Figure 5:
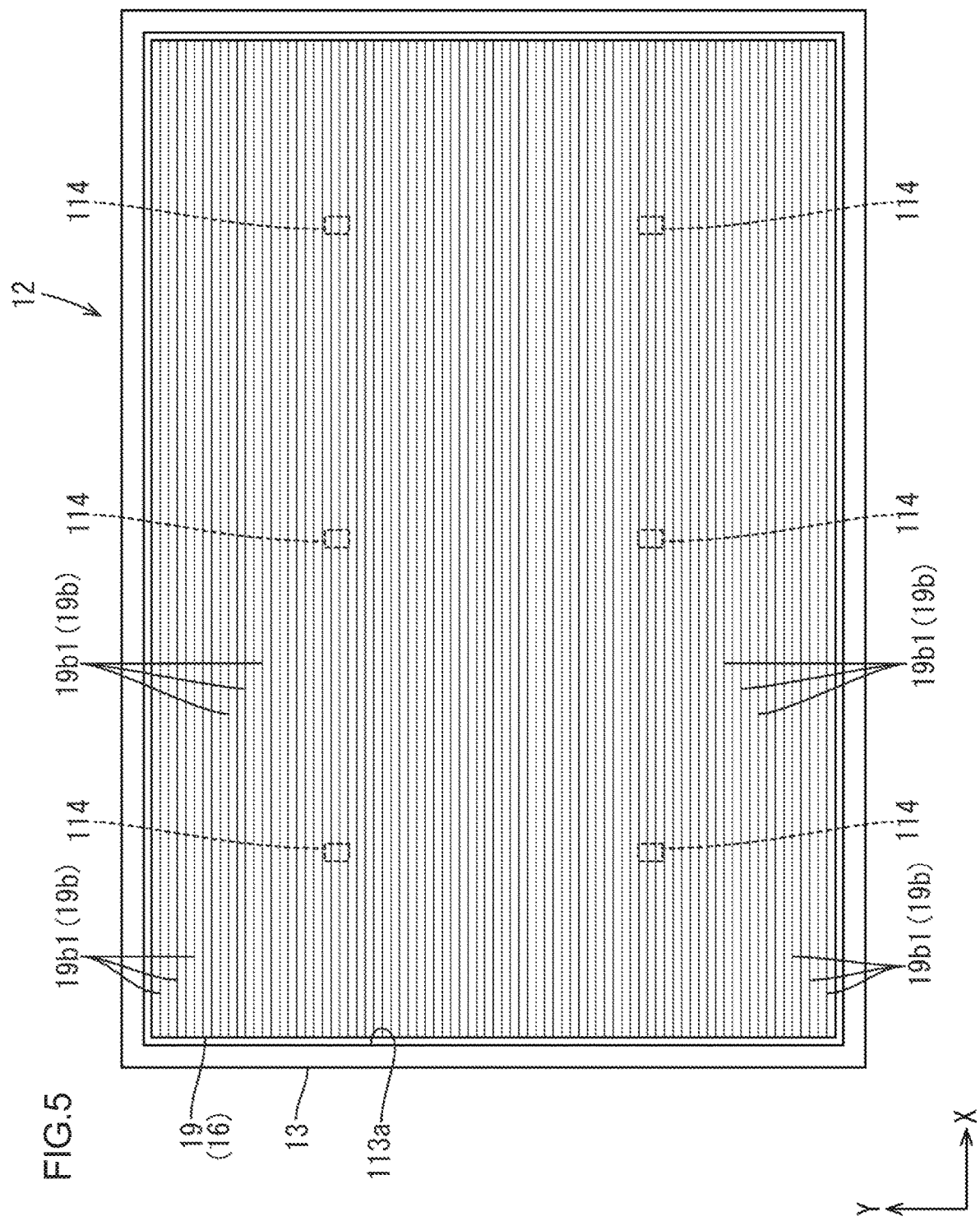
FIG. 5 is a plan view of a back light device according to a second embodiment.
Figure 6:
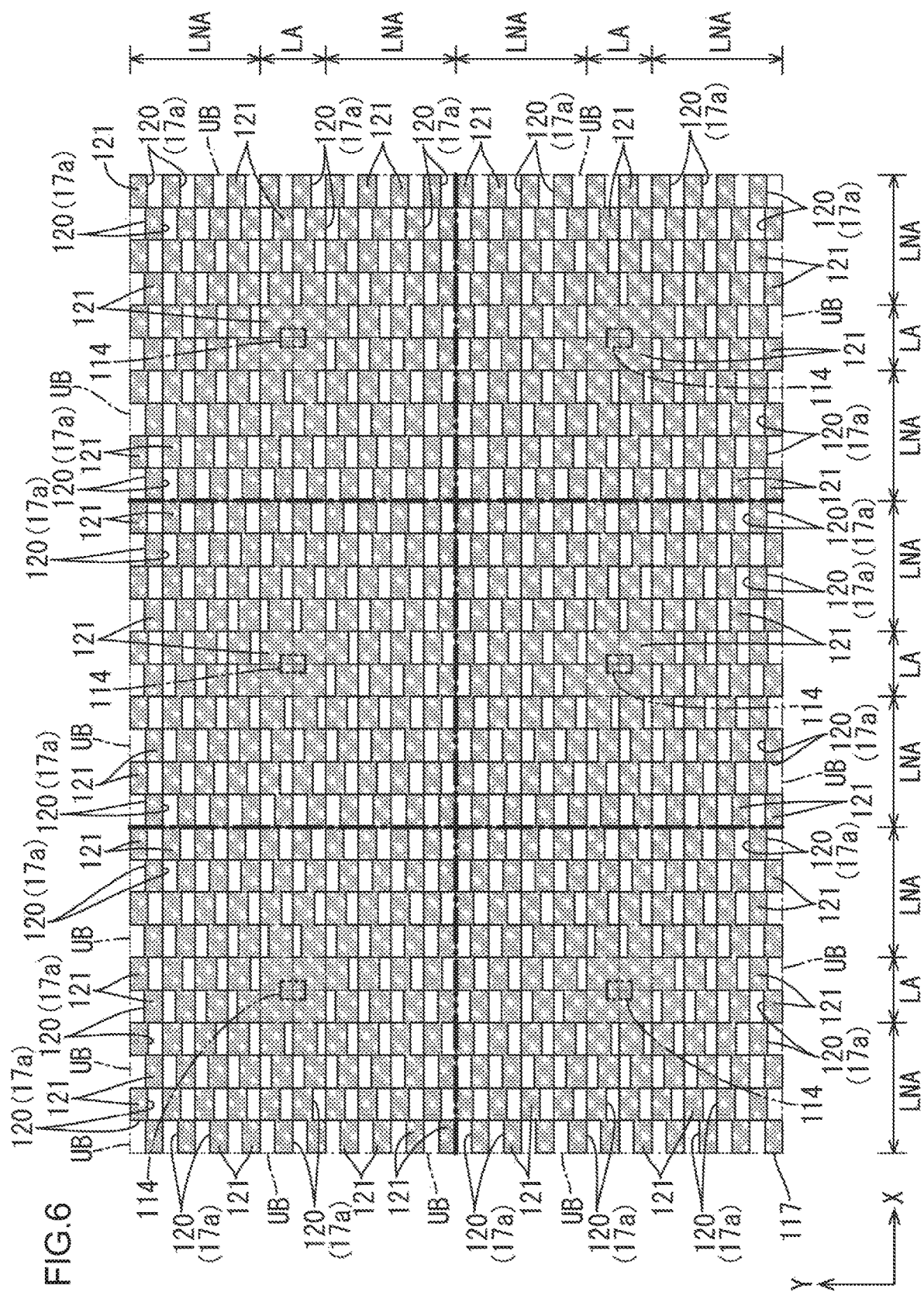
FIG. 6 is a plan view of a reflection sheet having the light transmitting function.

The following describes a second embodiment of the present invention with FIG. 5 or 6. The second embodiment illustrates a variation in installation number of LEDs 114 based on the first embodiment described above. Here, the description of the configuration and operational advantage common to that of the first embodiment is to be omitted.

As illustrated in FIG. 5, plural LEDs 114 according to this embodiment are arranged in line that are apart from one another in the Y-axis direction (first direction) and the X-axis direction (second direction), respectively. Specifically, three LEDs 114 in the Y-axis direction, and three LEDs 114 in the X-axis direction, i.e., six in total LEDs 114 are arranged within a plate face of a reflection sheet with light transmitting function 117 two dimensionally in a matrix array. Accordingly, as illustrated in FIG. 6, the same number of LED arrangement areas LA as the number of LEDs 114 are arranged in the reflection sheet with light transmitting function 117 such that the LED arrangement areas LA are spaced apart from one another in the Y-axis direction and the X-axis direction. Moreover, the same number of LED non-arrangement areas LNA as the number of LEDs 114 are arranged around the LED arrangement areas LA such that the LED non-arrangement areas LNA are disposed adjacent to one another. With such a configuration, reflection and transmittance of the light emitted from the plural LEDs 114 spaced apart from one another in the Y-axis direction and the X-axis direction is controlled by light reflective portions 121 and light transmissive portions 120 in the LED arrangement areas LA arranged in line apart from one another along the Y-axis direction and the X-axis direction as the arrangement direction of the LEDs 114 and the LED non-arrangement areas LNA around the LED arrangement areas LA in the reflection sheet with light transmitting function 117. This achieves a uniform quantity of emission light from a light exiting portion 113a.

Moreover, as illustrated in FIG. 6, the installation number (arrangement number) of light reflective portions 121 and light transmissive portions 120 arranged in the Y-axis direction and the X-axis direction in the plural LED non-arrangement areas LNA in the reflection sheet with light transmitting function 117 is an even number (specifically, twenty in the Y-axis direction and ten in the X-axis direction). Moreover, the installation number of unit blocks UP arranged in the Y-axis direction and the X-axis direction in the plural LED non-arrangement areas LNA is an even number (specifically, ten in the Y-axis direction and ten in the X-axis direction). With such a configuration, the light reflective portions 121 and the light transmissive portions 120 are arranged in the Y-axis direction and the X-axis direction at boundaries (illustrated by thick alternate long and short dashed lines in FIG. 6) in the LED non-arrangement areas LNA adjacent to one another in the Y-axis direction and the X-axis direction. This can prevent two successive arrangement of the light reflective portions 121 or the light transmissive portions 120. Accordingly, it becomes more difficult to identify the light transmissive portions 120 as the bright portion visually. Moreover, the LED arrangement areas LA according to this embodiment are each composed by the light reflective portions 121 only, and thus include no light transmissive portion 120.

According to this embodiment described above, the LEDs 114 are spaced apart in at least either the first direction or the second direction. The reflection sheet with light transmitting function 117 has the plural LED arrangement areas LA and the plural LED non-arrangement areas LNA. The LED arrangement areas LA are arranged in line at intervals along the arrangement direction of the LEDs 114. The LED non-arrangement areas LNA are disposed adjacent to one another around the LED arrangement areas LA. With such a configuration, reflection and transmittance of the light emitted from the LEDs 114 arranged in line at the intervals is controlled by the light reflective portions 121 and the light transmissive portions 120 in the LED arrangement areas arranged in line at the intervals along the arrangement direction of the LEDs 114 and the LED non-arrangement areas LNA around the LED arrangement areas LA in the reflection sheet with light transmitting function 117. This achieves a uniform quantity of emission light from the light exiting portion 113a.

Moreover, the reflection sheet with light transmitting function 117 has an even number of light reflective portions 121 and an even number of light transmissive portions 120 disposed in the arrangement direction in the LED non-arrangement areas LNA. With such a configuration, the light reflective portions 121 and the light transmissive portions 120 are each arranged at boundaries in the adjacent LED non-arrangement areas LNA. This can prevent two successive arrangement of the light reflective portions 121 or the light transmissive portions 120. Accordingly, it becomes more difficult to identify the light transmissive portions 120 as the bright portion visually.

Third Embodiment

Figure 7:
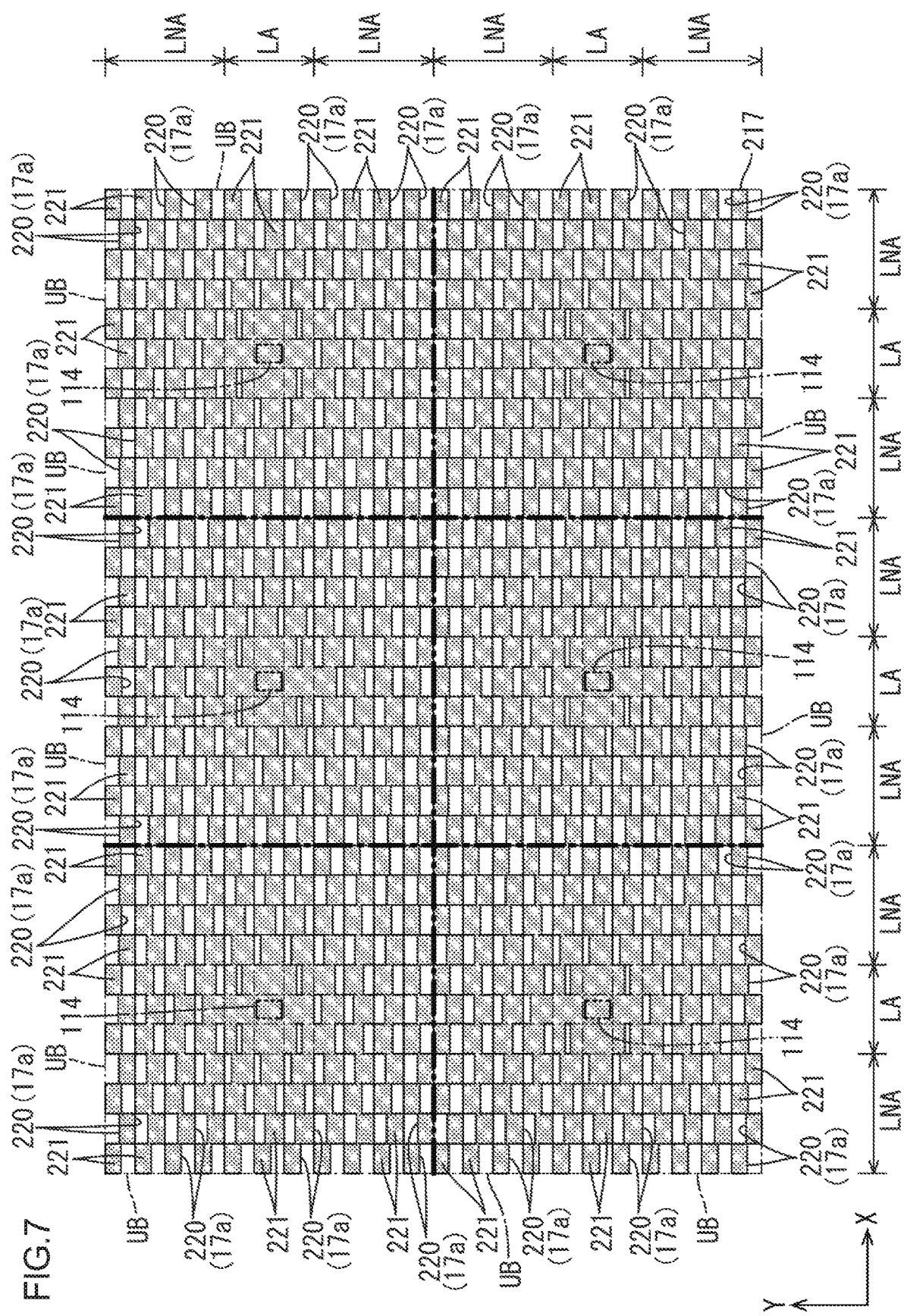
FIG. 7 is a plan view of a reflection sheet having the light transmitting function according to a third embodiment.

The following describes a third embodiment of the present invention with FIG. 7. In the third embodiment, illustrated are light transmissive portions 220 and light reflective portions 221 that are obtained by changing arrangement thereof in the second embodiment described above. Here, the description of the configuration and operational advantage common to that of the second embodiment is to be omitted.

As illustrated in FIG. 7, an installation number (arrangement number) of light reflective portions 221 and light transmissive portions 220 arranged in the X-axis direction (arrangement direction) in the plural LED non-arrangement areas LNA in a reflection sheet with light transmitting function 217 according to this embodiment is an odd number (specifically, eleven), whereas an installation number of light reflective portions 221 and light transmissive portions 220 arranged in the Y-axis direction (orthogonal to the arrangement direction) in the plural LED non-arrangement areas LNA is an even number (specifically, twenty-two). Moreover, an installation number of unit blocks UB arranged in the Y-axis direction and the X-axis direction in the plural LED non-arrangement areas LNA is an odd number (specifically, eleven). In addition, arrangement of the light reflective portions 221 and the light transmissive portions 220 in the adjacent LED non-arrangement areas in the X-axis direction is reversed from arrangement thereof in the Y-axis direction.

Specifically, as illustrated in FIG. 7, the LED non-arrangement areas LNA surrounding the LED arrangement areas LA, on the right and left end sides and the LED non-arrangement areas LNA surrounding the LED arrangement areas LA at the center portion differ from each other in relationship that every plural light reflective portions 221 and every plural light transmissive portions 220 in the Y-axis direction are arranged conversely. For instance, in the LED non-arrangement areas LNA surrounding the LED arrangement areas LA on the right and left end sides in FIG. 7, the light reflective portions 221 are arranged on right and left end positions and an upper end position. In contrast to this, in the LED non-arrangement areas LNA surrounding the LED arrangement areas LA at the center portion, the light transmissive portions 220 are arranged on the right and left end positions and the upper end position. In such a manner, even when an odd number of light reflective portions 221 and an odd number of light transmissive portions 220 are arranged in the X-axis direction in the plural LED non-arrangement areas LNA, the light reflective portions 221 and the light transmissive portions 220 are arranged conversely in the Y-axis direction in the LED non-arrangement areas LNA adjacent to each other in the X-axis direction. Accordingly, the light reflective portions 221 and the light transmissive portions 220 are arranged in line at the boundaries of the adjacent LED non-arrangement areas LNA (illustrated in FIG. 7 by thick alternate long and short dashed lines). This can prevent two successive arrangement of the light reflective portions 221 or the light transmissive portions 220. Accordingly, it becomes more difficult to identify the light transmissive portions 220 visually as the bright portion. Moreover, the LED arrangement areas LA according to this embodiment include the light reflective portions 221 and the light transmissive portions 220, which is similar to the first embodiment described above.

With this embodiment as described above, the installation number of light reflective portions 221 and light transmissive portions 220 arranged in the arrangement direction in the plural LED non-arrangement areas LNA is the reflection sheet with light transmitting function 217 is an odd number, and the light reflective portions 221 and light transmissive portions 220 in the plural LED non-arrangement areas LNA adjacent to each other in the arrangement direction are arranged conversely in the orthogonal direction. In such a manner, even when an odd number of light reflective portions 221 and an odd number of light transmissive portions 220 are arranged in the arrangement direction in the plural LED non-arrangement areas LNA, the light reflective portions 221 and the light transmissive portions 220 are arranged conversely in the orthogonal direction in the LED non-arrangement areas LNA adjacent to each other in the arrangement direction. Accordingly, the light reflective portions 221 and the light transmissive portions 220 are arranged in line at the boundaries of the adjacent LED non-arrangement areas LNA. This can prevent two successive arrangement of the light reflective portions 221 or the light transmissive portions 220. Accordingly, it becomes more difficult to identify the light transmissive portions 220 visually as the bright portion.

Fourth Embodiment

Figure 8:
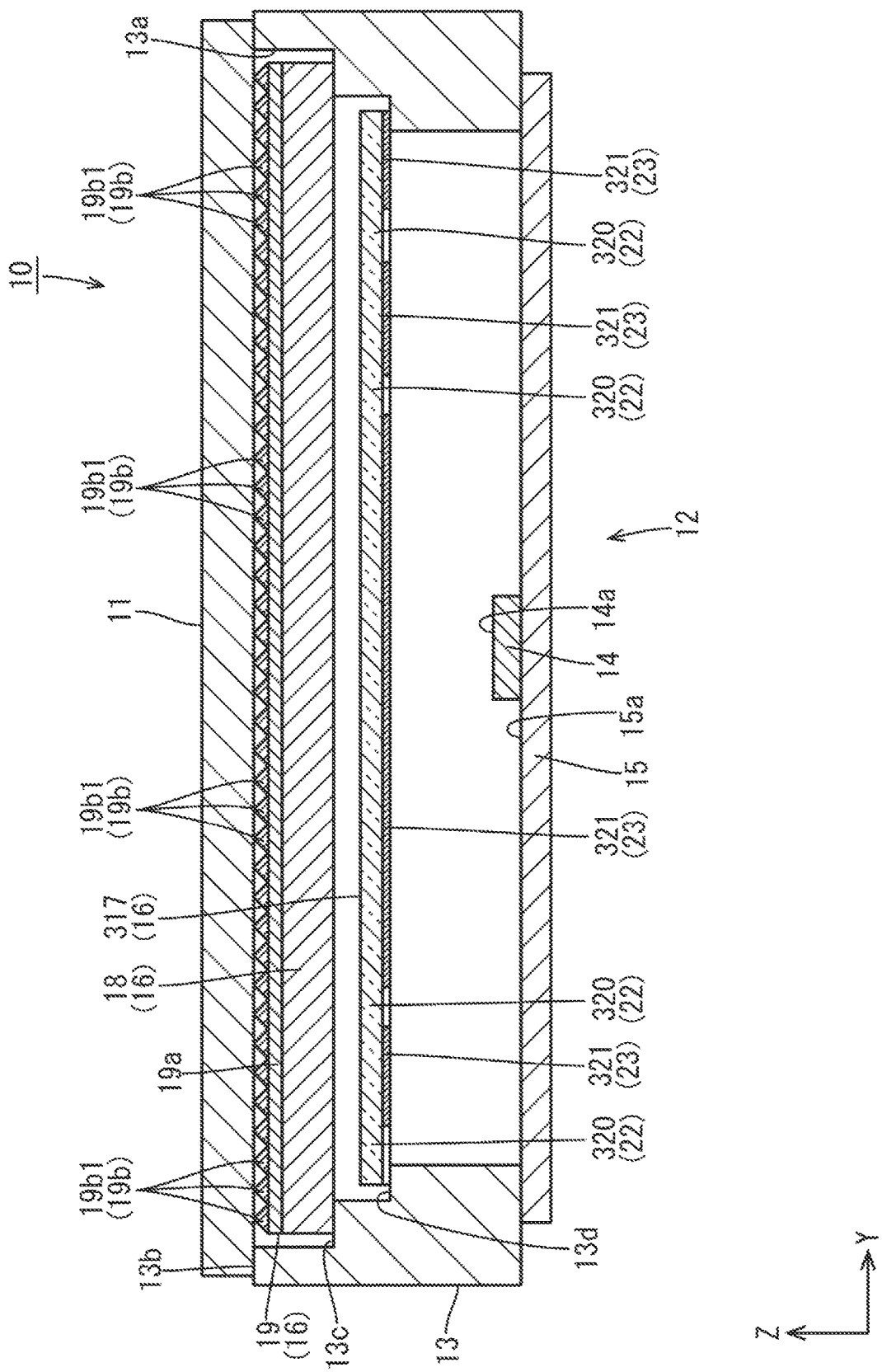
FIG. 8 is a sectional view of a liquid crystal display device according to a fourth embodiment.
Figure 9:
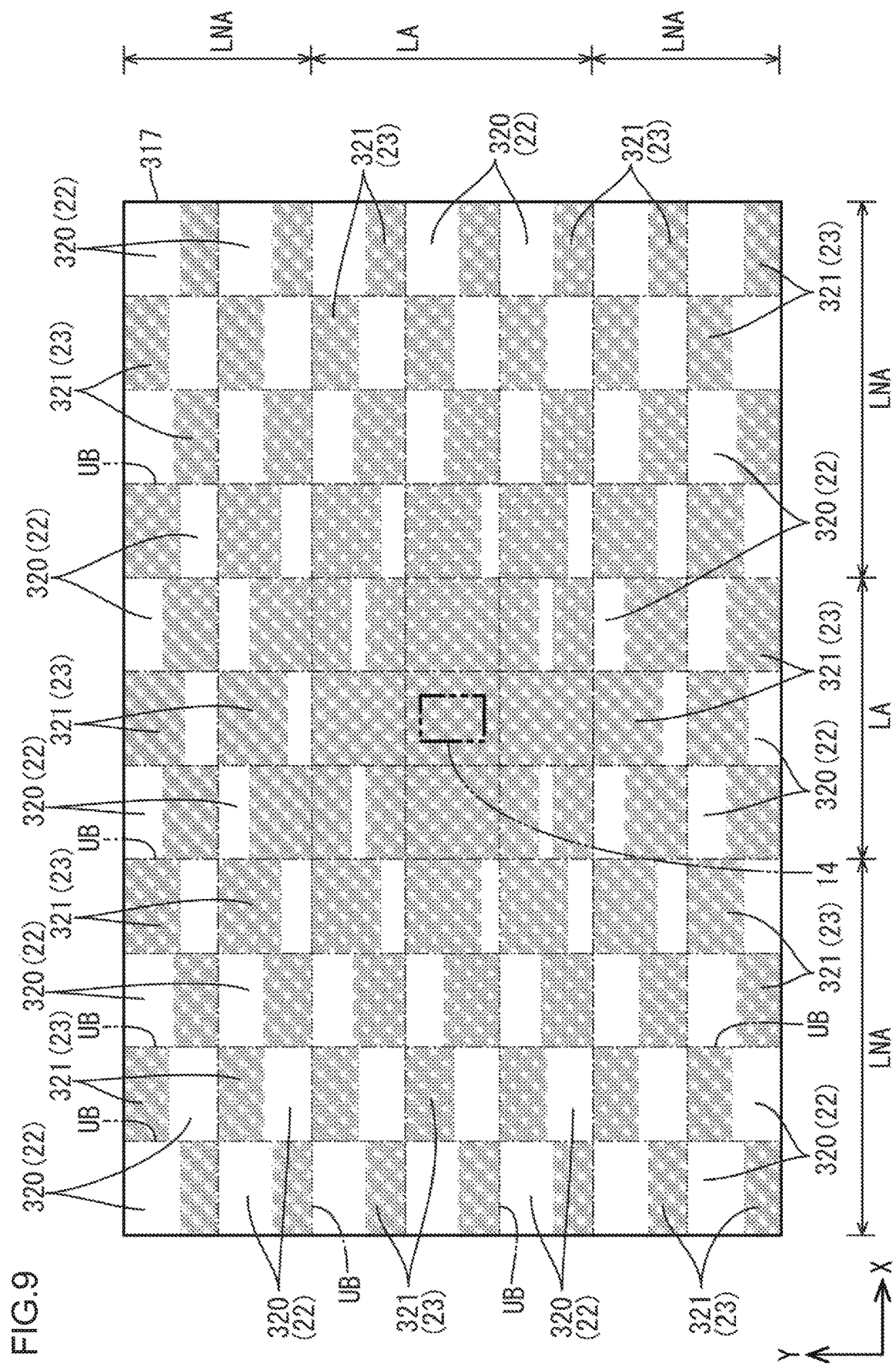
FIG. 9 is a plan view of a reflection sheet having the light transmitting function.

The following describes a fourth embodiment of the present invention with FIG. 8 or 9. The fourth embodiment illustrates a variation in configuration of a reflection sheet with light transmitting function 317 based on the first embodiment described above. Here, the description of the configuration and operational advantage common to that of the first embodiment is to be omitted.

As illustrated in FIGS. 8 and 9, a reflection sheet with light transmitting function 317 according to this embodiment is composed of a light transmitting plate 22 that is configured to transmit light, and a light reflective film 23 that is formed on the plate face of the light transmitting plate 22 partially to constitute light reflective portions 321. The light transmitting plate 22 is composed of a substantially transparent synthetic resin plate (e.g., made from PET). The light reflective film 23 has a surface that is made from ink in white excellent for light reflection. A printing technology such as screen printing, gravure printing, and ink-let printing is performed to a rear plate face of the light transmitting plate 22 to form the light reflective film 23. Moreover, the light reflective film 23 preferably has a film thickness of 20 μm, for example, but this is not necessarily limitative. The light reflective film 23 is selectively formed on the plate face of the light transmitting plate 22 at only a portion where the light reflective portions 321 are formed. Accordingly, a portion of the light transmitting plates 22 where no light reflective film 23 is formed (i.e., openings formed in the light reflective film 23) constitutes light transmissive portions 320. Note that FIG. 9 illustrates by hatch a region where the light reflective film 23 (light reflective portions 321) is formed in the reflection sheet with light transmitting function 317. With such a configuration, easier production of the reflection sheet with light transmitting function 317 is obtainable than the case where the light reflective portions 21 and the light transmissive portions 20 are formed by forming the openings 17a partially in the plate (light reflector) constituting the reflection sheet 17 having the light transmitting function as described above in the first embodiment (see FIG. 1). This is suitable for reduction in production cost. Especially, this is suitable for complicated arrangement patterns of the light reflective portions 321 and the light transmissive portions 320. In this embodiment, the light transmissive portions 320 are composed by the portion of the light transmitting plate 22 where no light reflective film 23 is formed. Consequently, the maximum area ratio of the light transmissive portions 320 to unit blocks UB in LED non-arrangement areas is larger than 50%. This achieves higher flexibility for setting an area ratio of the light reflective portions 321 and the light transmissive portions 320 than that in the first embodiment described above.

With this embodiment as described above, the reflection sheet with light transmitting function 317 is composed of the light transmitting plate 22 that is configured to transmit light, and the light reflective film 23 that is formed on the plate face of the light transmitting plate 22 partially to constitute the light reflective portions 321. The light transmitting plate 22 includes the portion where no light reflective film 23 is formed, the portion constituting the light transmissive portions 320. With such a configuration, easier production is obtainable than the case where the light reflective portions and the light transmissive portions are formed by forming the opening partially in the light reflector. This is suitable for reduction in production cost. Especially, this is suitable for complicated arrangement patterns of the light reflective portions 321 and the light transmissive portions 320.

Fifth Embodiment

Figure 10:
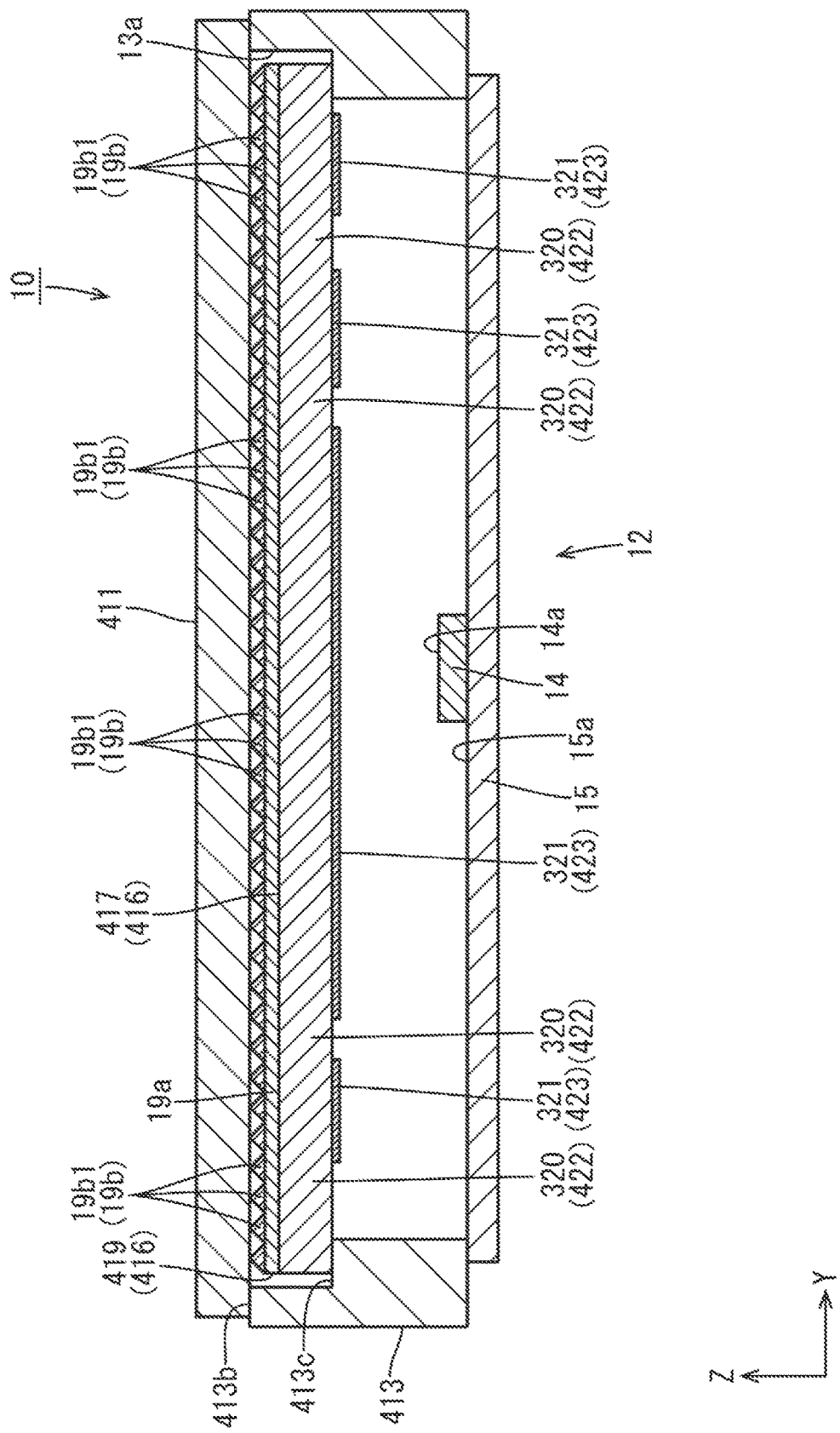
FIG. 10 is a sectional view of a liquid crystal display device according to a fifth embodiment.

The following describes a fifth embodiment of the present invention with FIG. 10. The fifth embodiment illustrates a variation in configuration that the diffusion plate is omitted from the fourth embodiment described above and the function thereof is shared by a reflection sheet with light transmitting function 417. Here, the description of the configuration and operational advantage common to that of the fourth embodiment is to be omitted.

As illustrated in FIG. 10, the reflection sheet with light transmitting function 417 according to this embodiment includes a light transmitting plate 422 containing a large number of diffusion particles (diffusing agent) dispersed and compounded for diffusing light. In other words, the light transmitting plate 422 has the same configuration as the diffusion plate 18 described in the first embodiment as above (see FIG. 1). Consequently, the light transmitting plate 422 can apply diffusion action to the light transmitted through the portion where no light reflective film 423 is formed. As described above, since the reflection sheet with light transmitting function 417 shares a light diffusing function in this embodiment, there is no need to prepare the diffusion plate 18 with only the light diffusing function as in the first embodiment described above. This is suitable for obtaining reduction in number (number of items) and in thickness of optical members 416. Moreover, the number of optical members 416 is reduced as described above, and accordingly, a casing 413 has a two-step sectional shape. The casing 413 includes a first step 413b configured to support a liquid crystal panel 411 and a second, step 413c configured to support the reflection sheet with light transmitting function 417. In addition, a prism sheet 419 is disposed directly on a front face of the reflection sheet with light transmitting function 417.

With this embodiment as described above, the reflection sheet with light transmitting function 417 includes the light transmitting plate 422 containing the diffusing agent for diffusing light. The diffusing agent contained in the light transmitting plate 422 is used for diffusing light as described above. Accordingly, it is no need to prepare a diffusion plate having a light diffusing function additionally. This is suitable for obtaining reduction in number of items and in thickness.

Sixth Embodiment

Figure 11:
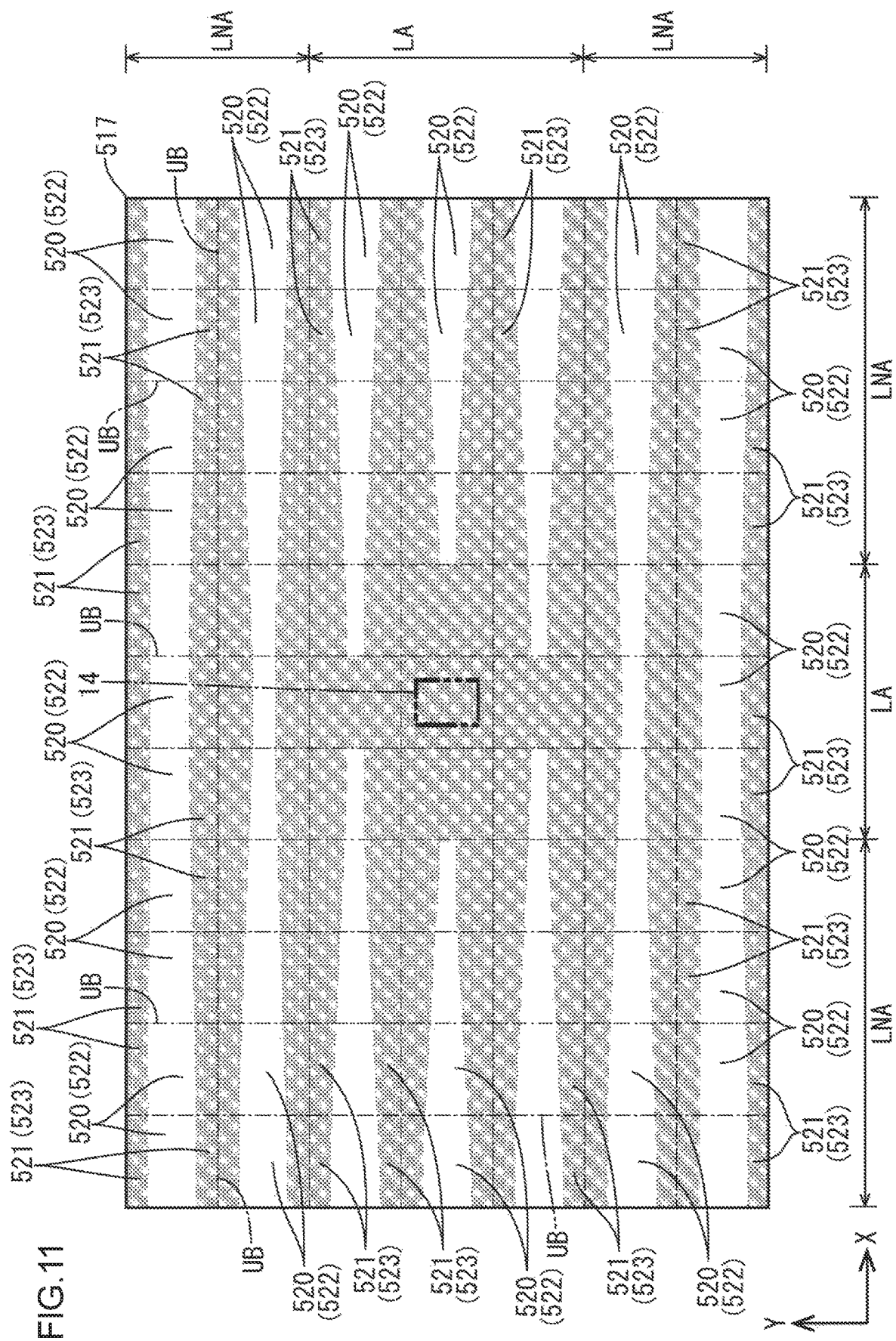
FIG. 11 is a plan view of a reflection sheet having the light transmitting function according to a sixth embodiment.

The following describes a sixth embodiment of the present invention with FIG. 11. In the sixth embodiment, illustrated are light transmissive portions 520 and light reflective portions 521 that are obtained by changing arrangement thereof in the fourth embodiment described above. Here, the description of the configuration and operational advantage common to that of the fourth embodiment is to be omitted.

As illustrated in FIG. 11, in a reflection sheet with light transmitting function 517 according to this embodiment, every plural light transmitting parts 520 (portion where light reflective films 523 are not formed in a light transmitting plate 522) and every plural light reflective portions 521 (light reflective film 523) are arranged alternately in the LED non-arrangement areas LNA in the Y-axis direction, and the light transmissive portions 520 and the light reflective portions 521 are arranged along the entire length of the LED non-arrangement areas LNA in the X-axis direction. Specifically, the light transmissive portions 520 and the light reflective portions 521 each extend substantially linearly in the X-axis direction in the LED non-arrangement areas LNA, whereas the parts cross all plural unit blocks UB arranged in the X-axis direction in the LED non-arrangement areas LNA. Boundaries between the light transmissive portions 520 and the light reflective portions 521 extend obliquely with respect to the Y-axis direction and the X-axis direction in most of the unit blocks UB. Accordingly, the light transmissive portions 520 and the light reflective portions 521 are successively arranged in the unit blocks UB adjacent to each other in the X-axis direction with no step. With such a configuration, the light transmissive portions 520 and the light reflective portions 521 are arranged in the reflection sheet with light transmitting function 517 in a simpler manner than the case where the light transmissive portions 320 and the light reflective portions 321 are arranged alternately in the Y-axis direction and the X-axis direction (see FIG. 9) as described above in the fourth embodiment. This achieves excellent productivity.

According to this embodiment as described above, the reflection sheet with light transmitting function 517 has every plural light transmissive portions 520 and every plural light reflective portions 521 that are configured to be disposed alternately in the second direction in at least the LED non-arrangement areas LNA. The light transmissive portions 520 and the light reflective portions 521 extend throughout their lengths in the first direction. With such a configuration, the light transmissive portions 520 and the light reflective portions 521 are arranged in the reflection sheet with light transmitting function 517 in a simpler manner than the case where every plural light transmissive portions and every plural light reflective portions are arranged alternately in the first direction and the second direction. This achieves excellent productivity.

Other Embodiments

The present invention is not limited to the embodiments described above with the description and the drawings. Such embodiments as under are contained in the technical scope of the present invention.

Figure 12:
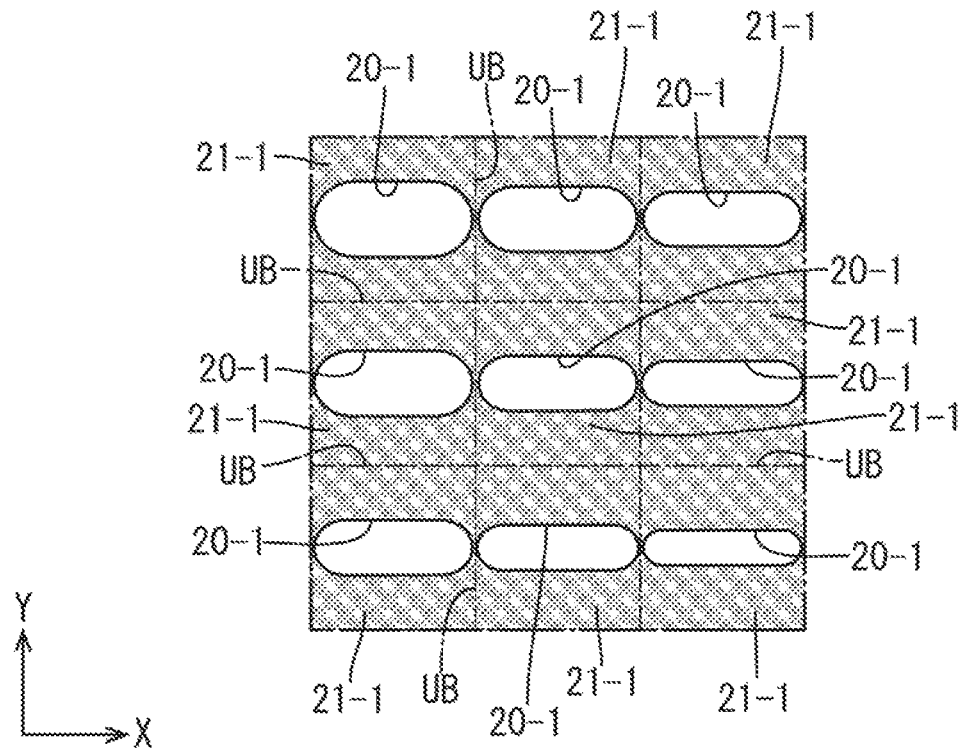
FIG. 12 is a plan view of a reflection sheet having the light transmitting function according to another embodiment (1).

(1) As for one modification of the embodiments described above, light transmissive portions 20-1 may each have an oblong shape oriented horizontally as illustrated in FIG. 12. In other words, a boundary between the light transmissive portion 20-1 and a light reflective portion 21-1 may be a curve other than a line. In FIG. 12, a given gap is provided between adjacent light transmissive portions 20-1 in the X-axis direction. The specific dimension of the gap is preferably 0.2 mm or less for suppressed uneven brightness. However, this is not necessarily imitative.

Figure 13:
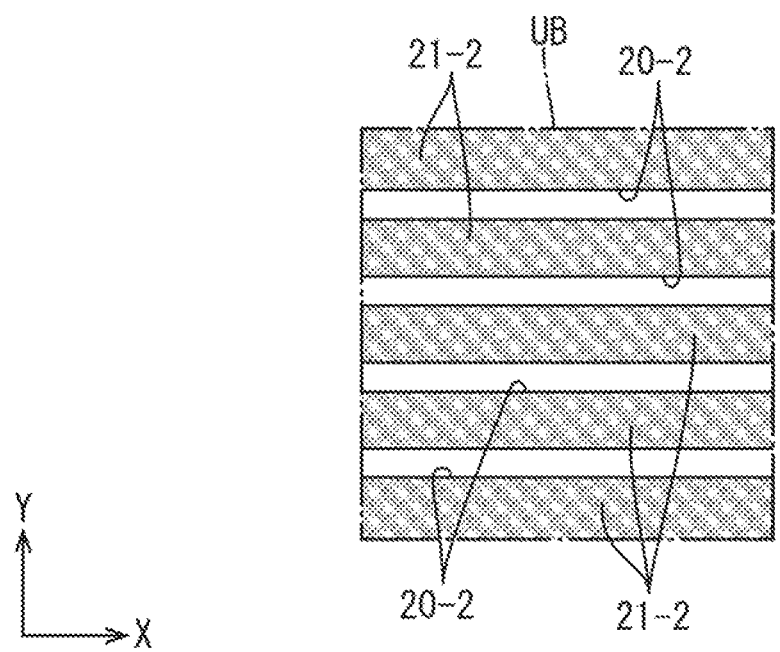
FIG. 13 is a plan view of a reflection sheet having the light transmitting function according to another embodiment (2).

(2) As for another modification of the embodiments described above, every plural light transmissive portions 20-2 and every plural light reflective portions 21-2 may be provided in one unit block UB as illustrated in FIG. 13. In FIG. 13, four light transmissive portions 20-2 and five light reflective portions 21-2 are provided in one unit block UB. A larger number of light transmissive portions 20-2 and light reflective portions 21-2 in one unit block UN tends to increase function of suppressing the uneven brightness.

Figure 14:
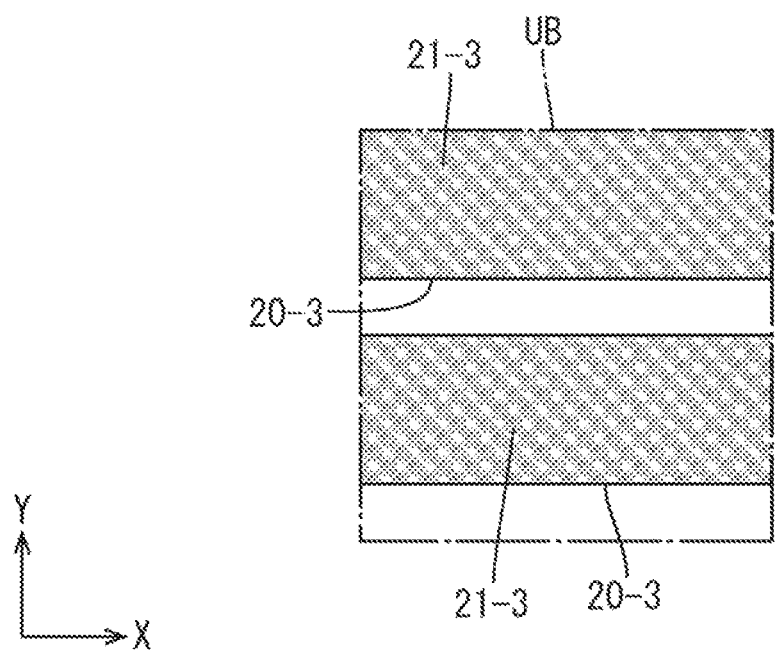
FIG. 14 is a plan view of a reflection sheet having the light transmitting function according to another embodiment (3).

(3) As for another modification of the embodiments described above, a smaller number of light transmissive portions 20-3 and a smaller number of light reflective portions 21-3 than those in the modification (2) above may be provided in one unit block UB as illustrated in FIG. 14. In FIG. 14, two light transmissive portions 20-3 and two light reflective portions 21-3 are provided in one unit block UB. A smaller number of light transmissive portions 20-2 and a smaller number of light reflective portions 21-2 in one unit block UB tend to make easy patterning of the light transmissive portions 20-3 and the light reflective portions 21-3.

(4) As for another modification of the modification (1) above, a planar shape of the light transmissive portion may be oval. The specific planar shape of the light transmissive portion is preferably longitudinal. Alternatively, the shape is appropriately variable except for rectangle, ellipse, and oval.

(5) Other than the modifications (2) and (3) above, appropriate variation is applicable to a specific number of light transmissive portions and light reflective portions included in one unit block.

(6) In the first to third embodiments above, the plate of the reflection sheet with light transmitting function is made from a synthetic resin. Alternatively, the plate of the reflection sheet with light transmitting function may be metallic. If the plate of the reflection sheet with light transmitting function is metallic, etching is performed to the reflection sheet with light transmitting function to achieve formation of openings with high definition.

(7) In the fourth to sixth embodiments above, the light reflective film of the reflection sheet with light transmitting function is made from ink in white. Alternatively, the light reflective film of the reflection sheet with light transmitting function may be a metallic light reflective film. If the light reflective film of the reflection sheet with light transmitting function is metallic, it is capable of forming the light reflective film on the plate face of the light transmitting plate using a technique such as vapor deposition.

(8) In the first to third embodiments above, the light transmissive portions are only formed by the openings configured to pass through the plate of the reflection sheet with light transmitting function. Alternatively, it is also possible to form grooves, in addition to the openings, on the plate of the reflection sheet with light transmitting function configured not to pass through the plate, and the opening and the grooves may constitute the light transmissive portions.

(9) In the second and third embodiments above, the plural LEDs are arranged in the Y-axis direction and the X-axis direction, respectively. Alternatively, the plural LEDs may be arranged in either the Y-axis direction or the X-axis direction only. Here, the arrangement number of LEDs in the Y-axis direction and the X-axis direction in the second and third embodiments is variable appropriately to the number illustrated therein.

(10) It is off course possible to combine the technical matters described in the embodiments described above appropriately.

(11) The embodiments described above each describe the case where the LED is used as the light source. Alternatively, an element other than the LED, such as an organic electro luminescence (EL) is available as the light source.

(12) The embodiments described above each describe the case where the liquid crystal panel and the back light device are fixed with the light-blocking fixing tape or the transparent adhesive member. Otherwise, the liquid crystal panel and the back light device can be fixed with a frame bezel that is configured to be attached to a front side with respect to the liquid crystal panel.

(13) In the embodiments described above, the liquid crystal display device (liquid crystal panel or the back light device) has the planar shape of the longitudinal rectangle. Alternatively, the planar shape of the liquid crystal display device may be a vertical rectangle, a square, a circle, a semicircle, an ellipse, an oval, and a trapezoid.

(14) Other than the embodiments described above, appropriate variation is applicable to a specific number, a type, and a lamination order of optical members used for the back light device.

(15) In the embodiments described above, the color filters of the liquid crystal panel are formed by three colors of red, green, and blue as one example. The present invention is also applicable to a liquid crystal panel having color filters formed by four colors of yellow or white in addition to red, green, and blue.

(16) In the embodiments described above, the TFT is used as the switching element of the liquid crystal panel. Alternatively, the present invention is applicable to a liquid crystal panel with a switching element other than the TFT (e.g., a thin film diode (TFD)). Moreover, the present invention is also applicable to a liquid crystal panel configured to perform monochrome display other than one configured to perform color display.

(17) In the embodiments described above, the liquid crystal panel is exemplarily described as the display panel. Alternatively, the present invention is applicable to other types of display panels (e.g., micro electro mechanical systems (MEMS) display panel).

EXPLANATION OF SYMBOLS

10: liquid crystal display device (display device)
11, 411: liquid crystal panel (display panel)
12: back light device (lighting device)
13, 413: casing
13*a*, 113*a*: light exiting portion
14, 114: LED (light source)
17, 117, 217, 317, 417, 517: reflection sheet with light transmitting function (reflecting member with light transmitting function)
17*a*: opening
18: diffusion plate
19, 419: prism sheet (light-collecting member)
19*b*1: unit prism (unit light collector)
20, 20-1, 20-2, 20-3, 120, 220, 320, 520: light transmissive portion
21, 21-1, 21-2, 21-3, 121, 221, 321, 521: light reflective portion
22, 422, 522: light transmitting plate
23, 423, 523: light reflective film
LA: LED arrangement area (light source arrangement area)
LNA: LED non-arrangement area (light source non-arrangement area)

The invention claimed is:

1. A lighting device comprising:
a casing including a light exiting portion through which light exits;
at least one light source accommodated within the casing;
a light-collecting member disposed in the light exiting portion, the light-collecting member including unit light collectors each having long dimensions in a first direction and being arranged in a second direction perpendicular to the first direction; and
a reflecting member having a light transmitting function and being disposed adjacent to the at least one light source with respect to the light-collecting member in the light exiting portion, the reflecting member including at least one light reflective portion configured to reflect light and at least one light transmissive portion configured to transmit light, the reflecting member including at least one light source arrangement area including at least a section overlapping the at least one light source, the at least one light source arrangement area including the at least one light reflective portion with an area ratio larger than an area ratio of at least one light source non-arrangement area around the at least one light reflective portion, at least the at least one light transmissive portion being longitudinal along the first direction.

2. The lighting device according to claim 1, wherein the at least one light transmissive portion and the at least one light reflective portion of the reflecting member having the light transmitting function include light transmissive portions and light reflective portions alternately arranged in the first direction and the second direction at least in the at least one light source non-arrangement area.

3. The lighting device according to claim 2, wherein the light transmissive portions of the reflecting member having the light transmitting function are arranged to contact lines along the second direction between the light transmissive portions adjacent to one another in the first direction at least in the at least one light source non-arrangement area.

4. The lighting device according to claim 2, wherein
the at least one light source includes light sources arranged at intervals in at least one of the first direction and the second direction, and
the at least one light source arrangement area and the at least one light source non-arrangement area of the reflecting member having the light transmitting function include light source arrangement areas and light source non-arrangement areas, respectively, the light source arrangement areas being arranged at intervals along an arrangement direction of the light sources, the light source non-arrangement areas being disposed adjacent to one another around the light source arrangement areas.

5. The lighting device according to claim 4, wherein the reflecting member having the light transmitting function includes an even number of the light reflective portions and an even number of the light transmissive portions disposed in the arrangement direction in the light source non-arrangement areas.

6. The lighting device according to claim 4, wherein
the at least one light reflective portion and the at least one light transmissive portion of the reflecting member having the light transmitting function include an odd number of the light reflective portions and an odd number of the light transmissive portions, respectively, in the arrangement direction in the light source non-arrangement areas, and
an arrangement of the light reflective portions and an arrangement of the light transmissive portions that are adjacent to the light reflective portions in the arrangement direction are reversed from each other in a direction perpendicular to the arrangement direction in the light source non-arrangement areas.

7. The lighting device according to claim 1, wherein
the at least one light transmissive portion and the at least one reflective portion of the reflecting member having the light transmitting function include light transmissive portions and light reflective portions, respectively,
the light transmissive portions and the light reflective portions are alternately arranged in the second direction in at least the light source non-arrangement areas, and
the light transmissive portions and the light reflective portions extend for an entire length of the reflecting member having the light transmitting function in the first direction.

8. The lighting device according to claim 1, wherein
the reflecting member having the light transmitting function includes a light reflector configured to reflect light, and
the light reflector includes openings and portions in which the openings are not formed, the openings being formed by opening sections of a plate face to define the light transmissive portions, the portions defining the light reflective portions.

9. The lighting device according to claim 1, wherein
the reflecting member having the light transmitting function includes a light transmitting plate that transmits light and light reflective films that are formed in sections of a plate face of the light transmitting plate to define the light reflective portions, and
the light transmitting plate includes sections in which the light reflective films are not formed, the sections defining the light transmissive portions.

10. The lighting device according to claim 9, wherein the reflecting member having the light transmitting function contains a diffusing agent so that the light transmitting plate diffuses light.

11. A display device, comprising:
the lighting device according to claim 1; and
a display panel configured to display an image using light from the lighting device.

* * * * *